United States Patent
Heile et al.

(10) Patent No.: US 6,298,319 B1
(45) Date of Patent: Oct. 2, 2001

(54) INCREMENTAL COMPILATION OF ELECTRONIC DESIGN FOR WORK GROUP

(75) Inventors: Francis B. Heile; Brent A. Fairbanks, both of Santa Clara, CA (US)

(73) Assignee: Altera Corporation, San Jose, CA (US)

(*) Notice: Subject to any disclaimer, the term of this patent is extended or adjusted under 35 U.S.C. 154(b) by 0 days.

(21) Appl. No.: 09/383,479

(22) Filed: Aug. 26, 1999

Related U.S. Application Data

(62) Division of application No. 08/957,957, filed on Oct. 27, 1997, now Pat. No. 5,983,277.
(60) Provisional application No. 60/029,277, filed on Oct. 28, 1996.

(51) Int. Cl.$^7$ ........................................................ G06F 9/45

(52) U.S. Cl. .............................. 703/26; 703/27; 709/215; 716/17; 717/6

(58) Field of Search ................................. 703/20, 26, 27; 716/17; 717/6; 709/232, 215

(56) References Cited

U.S. PATENT DOCUMENTS

| | | |
|---|---|---|
| 3,617,714 | 11/1971 | Kernighan et al. . |
| 4,827,427 | 5/1989 | Hyduke . |
| 4,882,690 | 11/1989 | Shinsha et al. . |

(List continued on next page.)

OTHER PUBLICATIONS

Jones, L. G., "Fast Incremental Netlist Complation of Hierarchial Schematics," IEEE, 1989, pp. 326–329.*
Chong Guan, Tan, "Incrementally Recompiling Verilog," IEEE, 1995, pp. 128–133.*
Jones, L. G., "Fast Batch and Incrementally Netlist Compilation of Hierarchical Schematics," IEEE, 1991, pp. 922–931.*
U.S. application No. 08/812,416, Gupte et al., filed Sep. 22, 1998.

(List continued on next page.)

*Primary Examiner*—Kevin J. Teska
*Assistant Examiner*—Thai Phan
(74) *Attorney, Agent, or Firm*—Beyer Weaver & Thomas LLP

(57) ABSTRACT

A work group computing system for facilitating programmable logic device design among multiple engineers has a global work space including design project source files, a compilation basis, a compilation report text file, a binary assignments database and a user-readable assignments text file. Any number of local work spaces contain downloaded versions of any of the project source files, local compilation processing results for that user and a local assignment database containing records of downloaded assignments. Downloaded project source files or assignments are assigned states by the user such as default, locked, owned-write, owned-read only to facilitate coordination amongst the user engineers. The system controls editing of files so that two engineers may not inadvertently edit the same global source file at the same time. Individual engineers receive automatic updates of new versions of source files; files that are being edited are locked, and an isolation mode allows an engineer to work with source files in an unchanging state. Each engineer incrementally compiles local changes made to source files in his own user work space to produce a local set of compilation and processing results. Incremental compilation uses unedited source files, the basis from the global work space, and the user's edited local files to produce the local processing results. Upon satisfactory results, edited source files and local processing results may replace and overwrite global files and results. Multiple engineers are allowed to work on complex logic design that can be implemented on a single, large capacity device.

24 Claims, 19 Drawing Sheets

U.S. PATENT DOCUMENTS

| | | |
|---|---|---|
| 5,051,938 | 9/1991 | Huduke . |
| 5,111,413 | 5/1992 | Lazansky et al. . |
| 5,220,657 | 6/1993 | Bly et al. . |
| 5,301,318 | 4/1994 | Mittal et al. . |
| 5,333,316 | 7/1994 | Champagne et al. . |
| 5,335,320 | 8/1994 | Iwata et al. . |
| 5,341,308 | 8/1994 | Mendel . |
| 5,367,468 | 11/1994 | Fukasawa et al. . |
| 5,436,849 | 7/1995 | Drumm . |
| 5,442,790 | 8/1995 | Nosenchuck . |
| 5,473,547 | 12/1995 | Muroga . |
| 5,499,192 | 3/1996 | Knapp et al. . |
| 5,504,885 | 4/1996 | Alashqur . |
| 5,513,124 | 4/1996 | Trimberger et al. . |
| 5,519,866 | 5/1996 | Lawrence et al. . |
| 5,526,517 * | 6/1996 | Jones et al. ............ 395/600 |
| 5,537,295 | 7/1996 | Van Den Bout et al. . |
| 5,541,849 | 7/1996 | Rostoker et al. . |
| 5,544,067 | 8/1996 | Rostoker et al. . |
| 5,550,782 | 8/1996 | Cliff et al. . |
| 5,583,749 | 12/1996 | Tredennick et al. . |
| 5,603,043 * | 2/1997 | Taylor et al. ............ 395/800 |
| 5,623,418 | 4/1997 | Rostoker et al. . |
| 5,636,133 | 6/1997 | Chesebro et al. . |
| 5,661,660 | 8/1997 | Freidin . |
| 5,670,895 | 9/1997 | Kazarian et al. . |
| 5,691,912 | 11/1997 | Duncan . |
| 5,696,454 | 12/1997 | Trimberger . |
| 5,712,794 | 1/1998 | Hong . |
| 5,721,912 | 2/1998 | Stepczyk et al. . |
| 5,724,251 | 3/1998 | Heavlin . |
| 5,754,441 | 5/1998 | Tokunoh et al. . |
| 5,761,079 | 6/1998 | Drumm . |
| 5,784,636 * | 7/1998 | Rupp ............ 395/800.37 |
| 5,812,847 | 9/1998 | Joshi et al. . |
| 5,825,661 | 10/1998 | Drumm . |
| 5,826,265 | 10/1998 | Van Huben et al. . |
| 5,831,863 | 11/1998 | Scepanovic et al. . |
| 5,856,926 | 1/1999 | Matsumoto et al. . |
| 5,859,776 | 1/1999 | Sato et al. . |
| 5,867,396 | 2/1999 | Farlour et al. . |
| 5,867,399 | 2/1999 | Rostoker et al. . |
| 5,870,308 | 2/1999 | Dangelo et al. . |
| 5,875,112 * | 2/1999 | Lee ............ 364/489 |
| 5,896,521 | 4/1999 | Shackleford et al. . |
| 5,903,475 | 5/1999 | Gupte et al. . |
| 5,983,277 * | 11/1999 | Heile et al. ............ 709/232 |
| 6,026,226 * | 2/2000 | Heile et al. ............ 395/500.13 |
| 6,102,964 * | 8/2000 | Tse et al. ............ 716/18 |
| 6,120,550 * | 9/2000 | Southgate et al. ............ 716/11 |
| 6,134,705 * | 10/2000 | Pedersen et al. ............ 716/18 |
| 6,161,211 * | 12/2000 | Southgate ............ 716/1 |
| 6,182,247 * | 1/2001 | Herrmann et al. ............ 714/39 |

OTHER PUBLICATIONS

Limaiem and Ammar, "A computer Assisted process Planning System Based on Optimization Criteria Compromises", *IEEE International Symposium on Assembly and Task Planning*, pp. 101–108, 1995.

Mace and Diamon, "Use of Programmable logic Devices as an Aid to System Design", *IEEE Colloquium on programmable Logic Devices for Digital Systems Implementation*, pp. 1/1–1/5, 1990.

Ginetti and Brasen, "Modifying the Netlist after Placement for Performance Improvement", *1999 IEEE Custom Integrated Circuits Conference*, pp. 9.2.1 through 9.2.4, 1993.

Peter Ramyalal Suraris et al., "A Quadrisection–Based Combined Place and Route Scheme for Standard Cells", *IEEE*, pp. 234–244, Mar. 1989.

* cited by examiner

File State Diagram

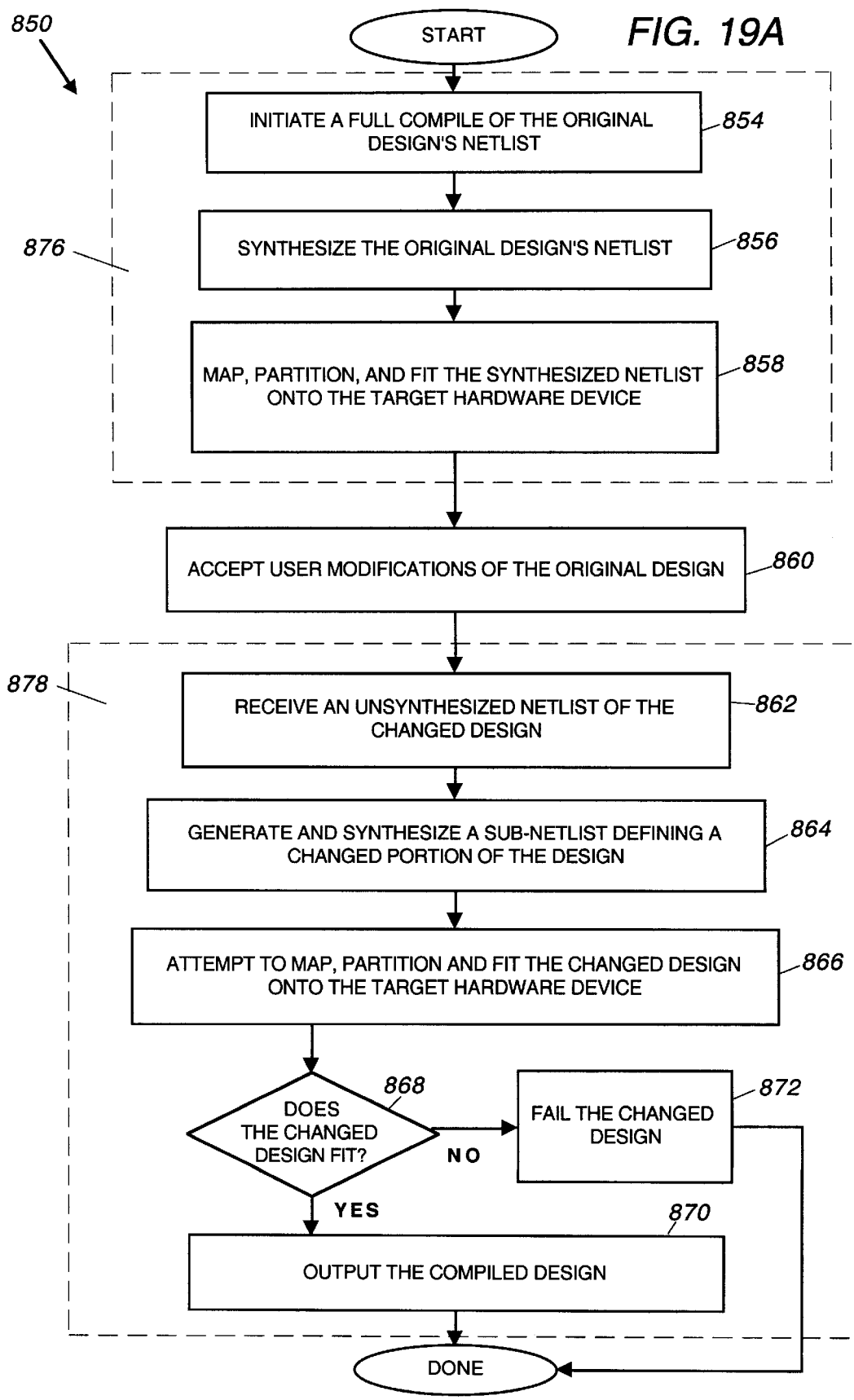

INCREMENTAL COMPILATION OF ELECTRONIC DESIGN FOR WORK GROUP

This is a divisional of U.S. patent application Ser. No. 08/957,957 filed on Oct. 27, 1997, which is now U.S. Pat. No. 5,983,277. This application claims priority of provisional U.S. patent application No. 60/029,277, filed Oct. 28, 1996, entitled "Tools For Designing Programmable Logic Devices" which is incorporated by reference.

The present application is related to the following applications filed on the same date herewith: U.S. patent application Ser. No. 08/958,002, now U.S. Pat. No. 6,134,705, naming B. Pedersen et al. as inventors, entitled "Generation Of Sub-Net Lists For Use In Incremental Compilation"; U.S. patent application Ser. No. 08/958,436, now U.S. Pat. No. 6,102,964, naming J. Tse et al. as inventors, entitled "Fitting For Incremental Compilation Of Electronic Designs"; U.S. patent application Ser. No. 08/958,670, now U.S. Pat. No. 6,080,204, naming D. Mendel as inventor, entitled "Parallel Processing For Computer Assisted Design Of Electronic Devices"; U.S. patent application Ser. No. 08/958,626, naming F. Heile et al. as inventors, entitled "Interface For Compiling Design Variations In Electronic Design Environments"; U.S. patent application Ser. No. 08/958,778, now U.S. Pat. No. 6,161,211, naming T. Southgate as inventor, entitled "Method And Apparatus For Automated Circuit Design"; U.S. patent application Ser. No. 08/958,434, now U.S. Pat. No. 6,110,223, naming T. Southgate et al. as inventors, entitled "Graphic Editor For Block Diagram Level Design Of Circuits"; U.S. patent application Ser. No. 08/958,432, now U.S. Pat. No. 6,120,550, naming T. Southgate et al. as inventors, entitled "Design File Templates For Implementation Of Logic Designs"; U.S. patent application Ser. No. 08/958,414, naming T. Southgate as inventor, entitled "Method For Providing Remote Software Technical Support"; U.S. patent application Ser. No. 08/958,777, naming T. Southgate as inventor, entitled "Method For Simulating A Circuit Design"; U.S. patent application Ser. No. 08/958,798, now U.S. Pat. No. 6,026,226, naming F. Heile as inventor, entitled "Local Compilation In Context Within A Design Hierarchy"; U.S. patent application Ser. No. 08/958,435, now U.S. Pat. No. 6,182,247, naming Alan L. Herrmann et al. as inventors, entitled "Embedded Logic Analyzer For A Programmable Logic Device"; and U.S. patent application Ser. No. 08/958,431, naming F. Heile as inventor, entitled "Electronic Design Automation Tool For Display Of Design Profile". The above related applications are incorporated herein by reference in their entireties for all purposes.

FIELD OF THE INVENTION

The present invention relates generally to the field of electronic design automation. More specifically, the present invention relates to a technique for allowing multiple engineers to collaborate on one design project.

BACKGROUND OF THE INVENTION

In the field of electronics, various electronic design automation (EDA) tools are useful for automating the process by which integrated circuits, multi-chip modules, boards, etc., are designed and manufactured. In particular, electronic design automation tools are useful in the design of standard integrated circuits, custom integrated circuits (e.g., ASICs), and in the design of an integrated circuit that may be programmable. Integrated circuits that may be programmable by a customer to produce a custom design for that customer include programmable logic devices (PLDs). Programmable logic devices refer to any integrated circuit that may be programmed to perform a desired function and include programmable logic arrays (PLAs), programmable array logic (PAL), field programmable gate arrays (FPGA), and a wide variety of other logic and memory devices that may be programmed. Often, such PLDs are designed and programmed by an engineer using an electronic design automation tool that takes the form of a software package.

The use of such a software package in programming a PLD allows an engineer to plan a design for the PLD, iterate over modifications to the design, test the design, and finally program the design into the PLD. In the past, one engineer was more than capable of designing and implementing the logic for one PLD. In other words, the capacity and complexity of past PLDs was not so much as to overwhelm one engineer because the PLDs were smaller in terms of the total logic elements they contained. Currently, however, PLDs are becoming larger, more complex, and include such powerful processing capabilities that it is becoming increasingly difficult for only one engineer to plan and implement a design for one PLD. For example, it is becoming extremely difficult for one engineer to develop a design for a PLD that includes around 100,000 logic elements or more, especially in the face of a tight schedule driven by time-to-market requirements. The short development time of a PLD is one of the strong reasons for choosing such a programmable device over other types of integrated circuits.

More frequently, integrated circuit customers who buy and program PLDs are choosing smaller devices because design entry can be performed by a single engineer in a reasonable amount of time. In such cases, only one engineer is needed to design and program each PLD. This approach has its drawbacks because the power of more complex PLDs is not being utilized. For those customers who choose to design a large circuit using a large, complex PLD, it is becoming increasingly difficult to coordinate the efforts of multiple engineers working on one design. The logistics of dividing up sections of the design to work on, keeping track of source files, and coordinating complied results amongst multiple engineers can be extremely difficult. Such coordination between multiple engineers working on a complex PLD design is becoming increasingly necessary as PLDs approach 100,000 logic elements and beyond. Without such coordination, the entire design process may take much longer than necessary and sub-optimal decisions may be made along the way.

Additionally, current compilers used with electronic design automation tools are often ill-suited for use by multiple engineers working on a complex PLD. When a minor change is made by one engineer to a small part of the overall PLD design, current compilers simply take all existing source files and recompile all of them in order to produce new compiled results. Once the complete design has been recompiled, it is then necessary to retest the complete design. Testing a complete design, including using a timing analyzer, simulation and creating vectors, can be very difficult and time consuming. During this time, the design must be frozen, thus preventing other engineers in the team from making and testing their own modifications.

Therefore, it would be desirable to have a technique for use with electronic design automation tools that allows multiple engineers to work in an efficient and coordinated fashion upon an electronic design for a complex integrated circuit, a multi-chip module, a circuit board, an ASIC, a PLD, etc. It would further be desirable for such an electronic design automation tool to have a compiler that was able to incrementally compile only those changes made by a single engineer so that the complete design would not have to be retested upon every compile.

SUMMARY OF THE INVENTION

To achieve the foregoing, and in accordance with the purpose of the present invention, a technique and system are disclosed that allow multiple engineers to collaborate in a work group on an electronic design, such as on a complex integrated circuit, a multi-chip module, a circuit board, an ASIC, a programmable logic device, etc. Such "work group computing" facilitates cooperation and sharing of information among multiple engineers so they can effectively and coherently work together on a complex design project. Engineers share project design files, assignment information, and processing operation results. This cooperation is especially advantageous for programmable logic devices that approach 100,000 logic elements and beyond.

In one embodiment of the invention, the system controls editing of files so that two engineers may not inadvertently edit the same global source file at the same time. The system also allows individual engineers to receive automatic updates of new versions of source files, allows files that are being edited to be locked, and provides for an isolation mode should an engineer wish to work with source files in an unchanging state. Advantageously, instead of a complex PLD design being broken up into multiple, smaller PLDs that are assigned to one engineer each, multiple engineers can efficiently work on a very complex design that can be implemented on a single, large capacity PLD. Each engineer is allowed to work on a portion of the overall design. Thus, designs of large PLDs can be completed faster and more efficiently. Additionally, the design of a complex PLD need not be broken up into various smaller, less complex PLDs which would result in an inefficient use of space on a circuit board.

In another embodiment of the invention, each engineer may incrementally compile local changes made to source files in his or her own user work space to produce a local set of compilation and processing results. The "basis" for incremental compilation is stored in the global work space. An engineer may thus make minor changes to one source file and incrementally compile only those changes using the basis from the global work space. Benefits of incremental compilation include a much faster compilation. Additionally, existing portions of the design not subject to recompilation may not need to be changed. For example, if the pinouts for a design have already been specified, and this portion is not subject to recompilation in an incremental compile, the pinouts will remain the same. Keeping large portions of the design static while only incrementally compiling smaller portions is advantageous in that those static portions do not have to be redesigned.

In one specific embodiment of the invention, incremental compilation includes the steps of: delineating a sphere of influence of user changes in a previously compiled design (the sphere of influence typically being defined within a netlist); and recompiling the logic from within this sphere of influence into appropriate logic elements available within a target hardware device. Such incremental compilation allows multiple engineers to share a single project and reduces compilation time for large devices.

BRIEF DESCRIPTION OF THE DRAWINGS

The invention, together with further advantages thereof, may best be understood by reference to the following description taken in conjunction with the accompanying drawings in which:

FIGS. 19A and 19B are a process flow diagram depicting how the incremental recompile methodologies in one embodiment of invention may be incorporated into a standard compilation/recompilation design flow.

DETAILED DESCRIPTION OF THE INVENTION

In order to develop an electronic design (such as for a programmable logic device), a programmable logic development system is used. As used herein, "electronic design" refers to a design for circuit boards and systems including multiple electronic devices and multi-chip modules, as well as integrated circuits. For convenience, the following discussion will generally refer to "integrated circuits", or to "PLDs", although the invention is not so limited.

Programmable Logic Development System

Figure 1:
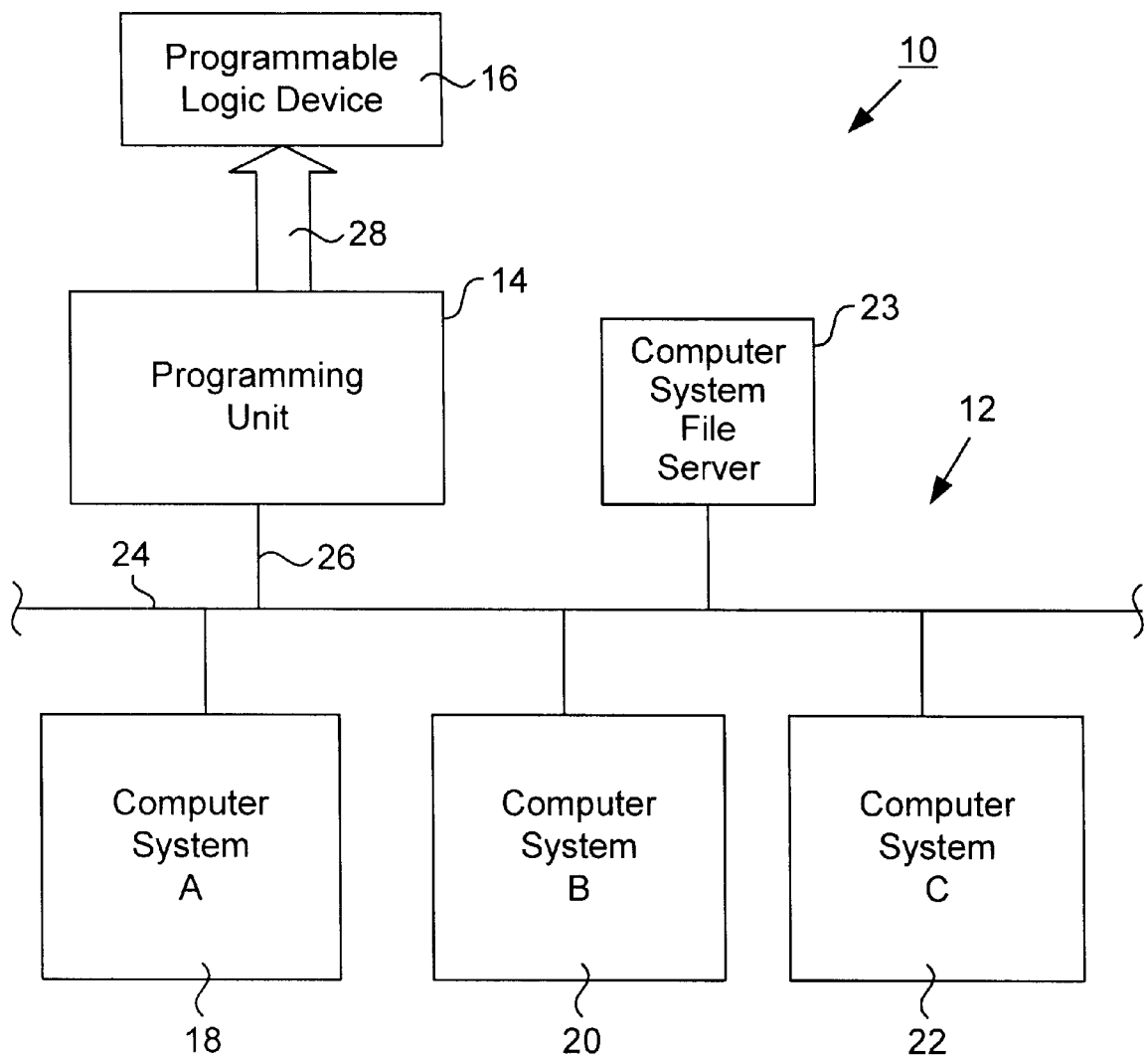
FIG. 1 is a block diagram of a programmable logic development system according to one embodiment of the present invention.

FIG. 1 is a block diagram of an embodiment of a programmable logic development system 10 that includes a computer network 12, a programming unit 14 and a programmable logic device 16 that is to be programmed. Computer network 12 includes any number of computers connected in a network such as computer system A 18, computer system B 20, computer system C 22 and computer system file server 23 all connected together through a network connection 24. Computer network 12 is connected via a cable 26 to programming unit 14, which in turn is connected via a programming cable 28 to the PLD 16. Alternatively, only one computer system could be directly connected to programming unit 14. Furthermore, computer network 12 need not be connected to programming unit 14 at all times, such as when a design is being developed, but could be connected only when PLD 16 is to be programmed.

Programming unit 14 may be any suitable hardware programming unit that accepts program instructions from computer network 12 in order to program PLD 16. By way of example, programming unit 14 may include an add-on logic programmer card for a computer, and a master programming unit, such as are available from Altera Corporation of San Jose, Calif. PLD 16 may be present in a system or in a programming station. In operation, any number of engineers use computer network 12 in order to develop programming instructions using an electronic design automation software tool. Once a design has been developed and entered by the engineers, the design is compiled and verified before being downloaded to the programming unit. The programming unit 14 is then able to use the downloaded design in order to program PLD 16. The various engineers are able to use computer network 12 in an efficient and coordinated fashion in order to develop a design for PLD 16 as will be explained below in the following figures.

Such a programmable logic development system is used to create an electronic design. Design entry and processing occurs in the context of a "project". A project includes a project file, design files, assignment files, and simulation files, together with hierarchy information, system settings, and output files, which includes programming files and report files. A project database may also exist, which contains intermediate data structures and version information.

A project contains one or more hierarchies of design entities and each design hierarchy tree has a root entity, which is the topmost design entity in that hierarchy tree (the top-level functional block). Other design entities in the design hierarchy tree are called child entities. Also, a design hierarchy may contain entities for which there is no corresponding design file, for example, in a top-down design methodology. That part of a hierarchy which contains such not-yet-implemented entities is not compiled or simulated until a design file is supplied for each entity. In this case, template source files are automatically generated which have defined interfaces but empty bodies to assist in implementing these parts of a project. A user creates a design by specifying and implementing functional blocks, as will now be described in the context of an exemplary design methodology.

Design Methodology

Figure 2:
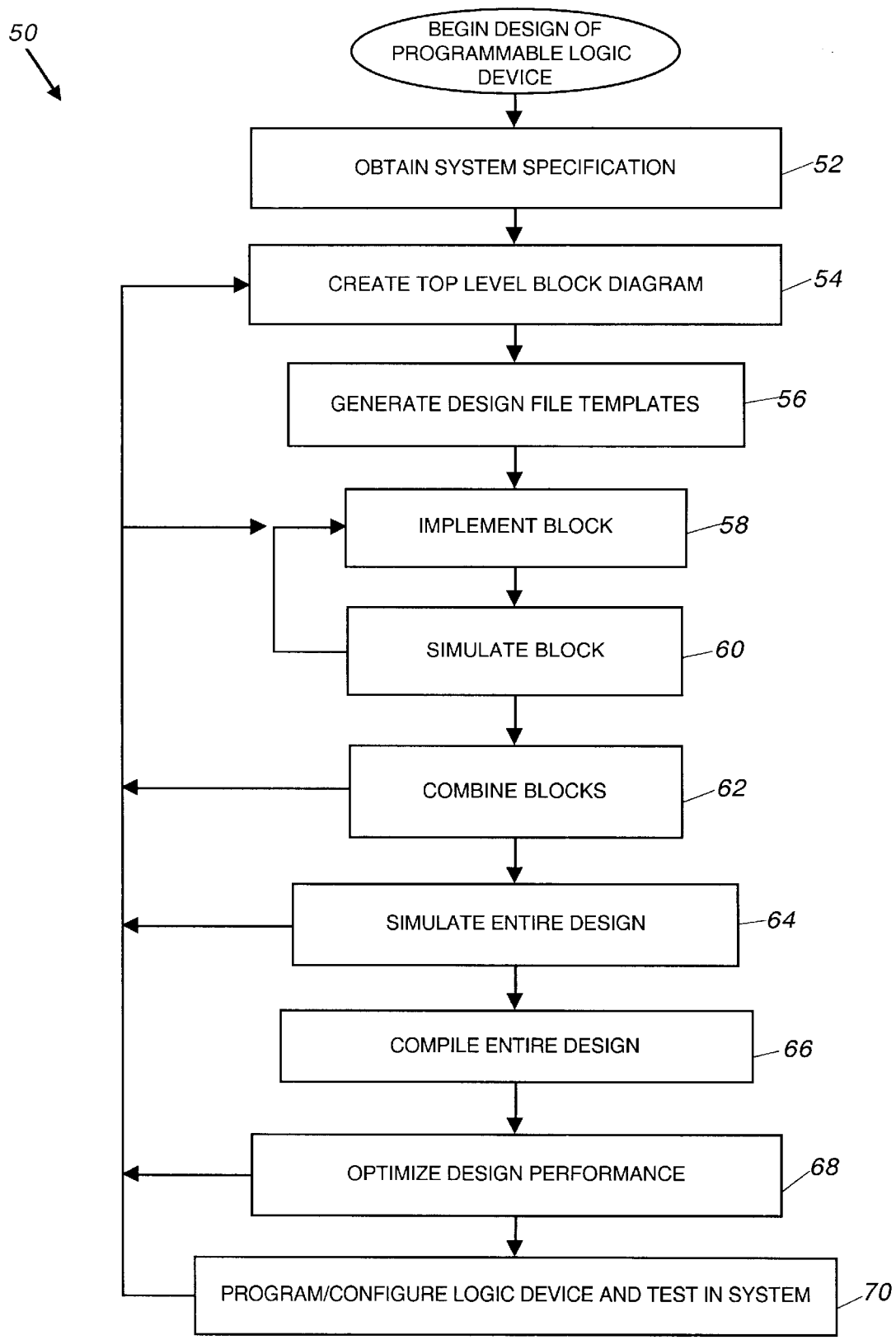
FIG. 2 is a flowchart of a design methodology used to design a programmable logic device according to one embodiment of the present invention.

FIG. 2 shows a design methodology 50 for using a system design specification in order to develop a design with which to program a PLD. It should be appreciated that the present invention may be practiced in the context of a wide variety of design methodologies. By way of example, the work group computing techniques and system of the present invention work well with an electronic design automation (EDA) software tool within the framework of the methodology of FIG. 2.

In step 52 a system specification for the PLD to be programmed is obtained. This specification is an external document or file that describes, for example, the device pin names, the functionality of each of the pins, the desired system functionality, timing and resource budgets, and the like. The multiple engineers within a work group will use this system specification in order to create a design with the EDA tool that will then be used to program a PLD.

Once the system specification is obtained, creation of a design using functional block diagrams is begun. In step 54 a top-level block diagram is created in which connections between lower-level designs blocks are specified. In this block, the target device, speed grade, and key timing requirements may be specified. Those skilled in the art will recognize that this top-level block may also include blocks that have already been developed or implemented or that have been obtained from a third party provider. This top-level block may also be converted into an HDL file, or the like, for use in other related design tools, such as an external simulator.

Step 56 includes generating design file templates with the EDA tool for all blocks present in the top-level block diagram of step 54. After the designer has created a block which has not yet been implemented, the system may generate a design file template. Such templates may display a block in a window format including, for example, a title, a date, etc. around the boundaries. It may also include some details of the functional content depicted within the window. The design file templates may be in any specified design format including VHDL, AHDL, Verilog, block diagram, schematic, or other like format. In the case of a VHDL block, the template may also include much of the formatting and necessary syntax for any VHDL block. The user need only take the template and add the portion of VHDL syntax required to implement the desired function.

Those skilled in the art will recognize that design file templates such as these can be used as starting points for the design of the structural or functional entities needed by the design. Thus, a design file template may serve as a reusable object for different instances of a block in one or more designs. More importantly, design file templates will be employed to reduce the amount of labor that the designer must expend to generate the logic in the blocks. In one embodiment, the generation of the design file templates is done in such a way that the templates can be updated later if the top-level block diagram changes.

Next, in step 58, each of the blocks of the top-level block is implemented using the EDA tool. It is noted that for more complicated designs, there may be additional levels of block diagrams (i.e., blocks within blocks). If changes are required at the top-level then the top-level block diagram is updated and the sub-designs are preferably automatically updated as well.

Furthermore, a block may be compiled through to a fitting stage for a particular integrated circuit die to provide information about resource utilization, timing performance, etc., as required for a given design. As such, it is envisioned that some timing optimization may be performed during step 58. This sequence illustrates a style of design in which an engineer first designs, then compiles and simulates, and then returns to design again if the simulation results are not satisfactory. In another style, an engineer may iterate through a number of design followed by simulation loops before finally compiling the complete design.

Concerning block implementation order, one or more of the following factors can be used to determine implementation order: (1) the complexity of a block; (2) the uncertainty or risk associated with a block; and/or (3) how far upstream and/or downstream in a given data-path the block resides. Each of steps 60, 62, 64, 68 and 70 may also lead back to this block implementation step for additional implementation necessitated by later changes in the design.

In step 60 a block is simulated functionally at the source level using a behavioral simulator and vectors generated by using a VHDL or Verilog test bench, for example. The simulation results can then be displayed or otherwise presented/recorded as waveforms, text or annotated onto the source files. The designer may also return to step 58 to implement a block again. Also, at this point a block may be compiled or a timing analysis performed.

Once the designer is satisfied with the simulation results, in step 62 the block is combined with other blocks and the resulting group is simulated together. In some cases, it may be useful to complete a full compilation to provide critical resource and timing information. Also, output simulation vectors from one block may become the input simulation vectors to the next block. The designer may also return to step 54 to modify the top-level block or to step 58 to implement a block again.

Next, in step 64, the entire design is simulated functionally at the source level using a behavioral simulator. Preferably, the top-level block diagram is fully specified before simulation and shows complete design connectivity. Vectors can be generated using a VHDL or Verilog test bench. Again, the simulation results can be displayed either as waveforms or annotated onto the source files. The designer may also return to step 54 to modify the top-level block or to step 58 to implement a block again. In step 66 the entire design is compiled through to a file containing the information needed to program a PLD to implement the user's design, such as to a "programming output file".

A wide variety of compile techniques may be used depending upon the type of design methodology and the technology used (such as PC boards, ASICs, PLDs, etc.).

By way of example, a few examples of compilation are presented below. For a PLD, compilation includes the steps of synthesis, place and route, generation of programming files and simulation. For a traditional integrated circuit design with a custom layout, compilation includes a layout versus schematic check, a design rule checker and simulations. For integrated circuit design using a high level design tool, compilation includes synthesis from a language such as VHDL or Verilog, automatic place and route and simulations. For printed circuit boards, compilation includes automatic routing, design rule checking, lumped parameter extraction and simulation. Of course, other types of compilation and variations on the above are possible.

In one specific embodiment of the present invention, an incremental compile technique has been found to work well in a multiple engineer environment. This technique of incremental compilation is described in more detail below with reference to FIGS. 17, 18, 19A and 19B.

Following compilation in step 66, in step 68 the timing checker inside the compiler is used to determine if the performance goals for the design have been met. Also, timing simulations are used to check performance details. In addition, other analysis tools such as a design profiler and/or layout editor can be used to further optimize the performance of the design. Preferably, optimization is not performed prior to step 68 because full compilation is usually required to establish the location of one or more critical paths within the design. The designer may also return to step 54 to modify the top-level block or to step 58 to implement a block again.

Next, in step 70 the device is programmed/configured using programming unit 14 and tested in the system. Again, the designer may also return to step 54 to modify the top-level block or to step 58 to implement a block again. While methodology 50 presents a top-down design process, it may also be used to support a bottom-up type methodology.

A wide variety of methods of computing may be practiced within the above design methodology. In particular, parallel processing may be used to enable multiple CPUs to work on different aspects of a design simultaneously and thus reduce the total amount of time it takes to solve the entire design. Parallel processing may be achieved during many of the phases of processing a design such as: multiple compilation points, netlist extraction, hierarchical synthesis, extracted independent region synthesis, general synthesis, partitioning, multiple fitters for different chips, partitioning sub-sections within a fitter, library of graph algorithms, etc.

Now that a design methodology has been described by which an engineer may develop a design for a PLD, an embodiment of a work group computing framework in which multiple engineers may collaborate on a particular design will now be discussed.

Work Space Overview

Figure 3:
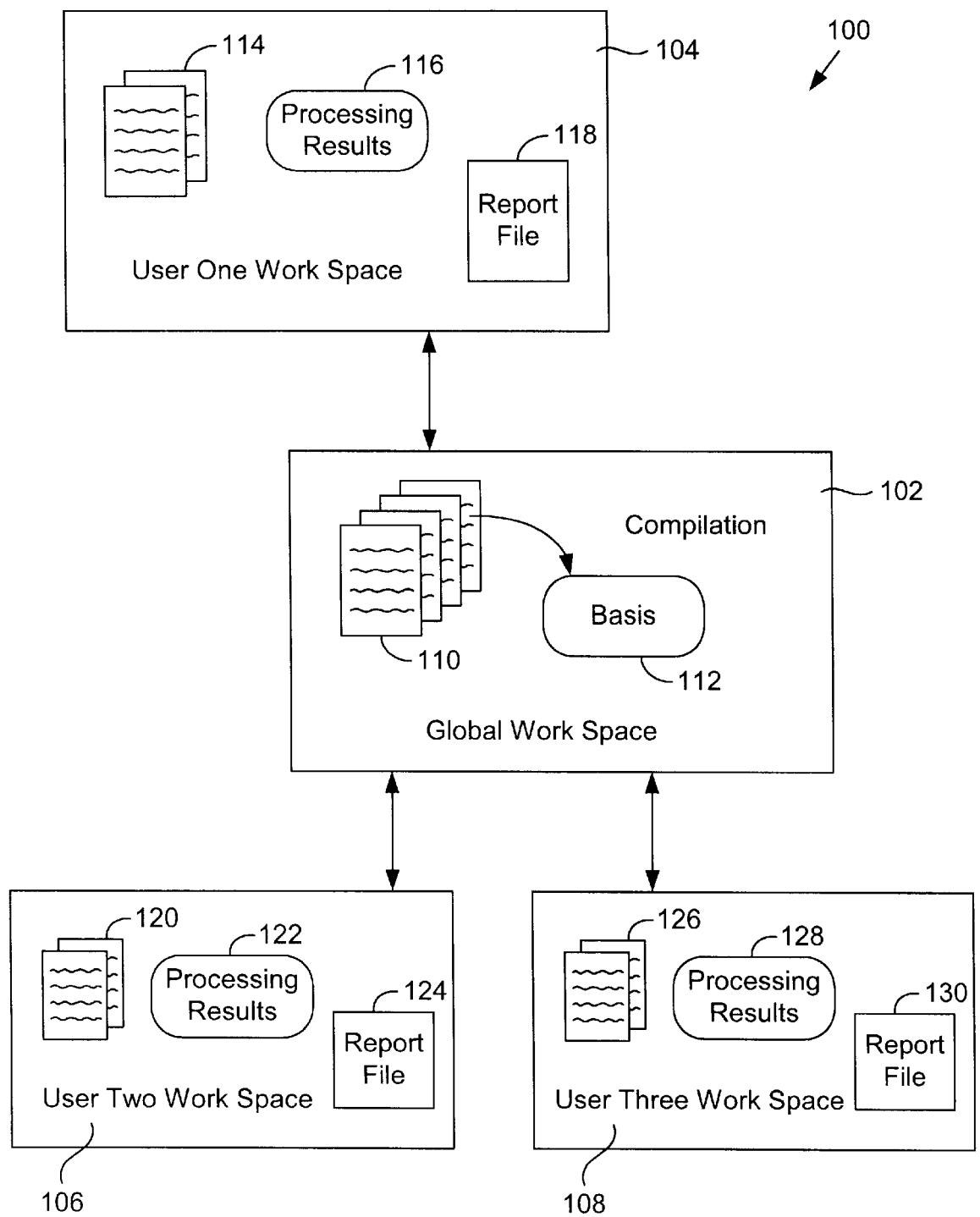
FIG. 3 illustrates symbolically an embodiment of a design project database.

FIG. 3 illustrates symbolically one embodiment of a project database 100. Project database 100 is a database of source files and processing results utilized by multiple engineers in the context of creating a design for a PLD. Project database 100 may be implemented and stored on a wide variety of computers in a wide variety of manners. By way of example, project database 100 may be stored on a single computer system, or preferably project database 100 is implemented on a number of computer systems, each being used by a single engineer. Project database 100 includes a global work space 102 that is connected electronically via a network connection, cable, computer hardware or other similar connections 103 to a User One work space 104, a User Two work space 106, and a User Three work space 108.

It should be appreciated that any number of engineers may be working on the project, and thus, any number of user work spaces may be present. The global work space and the various user work spaces may be present all on the same computer system in different file directories or the like, or alternatively, each work space may be present on a computer system by itself or in combination with another work space. In another embodiment, work spaces may even be present together within a single file directory, folder, etc., as long as suitable conventions are used to differentiate the work spaces and their contents for the various users.

A work space may contain a wide variety of information and may be implemented in many forms. By way of example, in one embodiment, a local work space is a given engineer's view of the state of the PLD design project and includes a directory where all local source files are stored, and a view of the project database showing the processing operation results for those sets of source files. The work space concept is most meaningful for multiple engineers working together on a single design. When version control of files is enabled, there is also a global work space that is different from the work space for each user. The global work space can, for example, use a central project database directory as the directory that contains the last officially checked in version of all source files, and the last officially checked in version of processing operation results for those files.

With multiple engineers, each design project in the system includes a global work space and a work space for each user. Alternatively, a user may work on more than one design project within his or her work space, as long as each project is suitably differentiated from the others. When a user views or edits a file, he does so in his own work space. The processing operation results that each user sees are based on the local source files in his or her work space directory. The global work space directory, where the central database is stored, has the currently checked in version of each file, along with the currently checked in version of the global processing operation results, or basis. Global work space 102 includes project source files 110 which are compiled into a basis 112. Project source files 110 include all of the source files for the current design project and may exist in memory or on disk. Source files 110 are compiled into a basis 112 which is a binary database containing the processing operation results or compiled results for the global work space source files. Basis 112 is also used by individual users in order to perform an incremental compile as will be explained below. Once a user performs a compile, he may replace basis 112 with his processing results. Thus, basis 112 may at a given time be the same as recent processing results for a given user.

Together source files 110 contain all information necessary to define a project. A project may be represented as a hierarchy. For example, the top level of a project is the root of a project, the second level may include a controller block, a memory block, and an ALU block, the third level (as descended from the ALU block) may include a multiplexer, an adder, and a multiplier, and so on. The various nodes of such hierarchies are detailed in the source files. Source files may specify state machines, truth tables, waveforms of signals at specific nodes, etc. Source files representing nodes may specify inputs and outputs as well as the logical operations of their nodes. Ancillary source files may specify information not directly associated with any one particular node. For example, some ancillary source files may specify assignments or vectors.

Individual users have their own work spaces in which they work on developing the current project design. User One work space 104 includes a local copy of project source files 114, processing results 116, and a report file 118. Local source files 114 are local copies of global source files 110 that User One is currently editing or experimenting with. A user may transfer or download any number of the global source files 110. A protocol by which User One may check out, edit and replace such files will be discussed below with reference to FIG. 8. Performing an "incremental compile" using local source files 114 produces processing results 116. These results 116 are in the form of a binary database including compilation results, the interactive simulator results and the static timing analyzer results. Preferably, processing results 116 are produced upon an incremental compile by using basis 112, any unedited global source files 110, and any locally edited source files 114. It should be appreciated that processing results 116 may be stored in User One work space 104 or may be stored in any other location such as global work space 102, such that processing results 116 are able to be viewed primarily by User One.

Report file 118 is a view for User One of the binary database processing results 116. Report file 118 includes final logic equations, final hierarchical assignments, a list of macro cells that implement particular functions, error messages, compilation results and the like. Report file 118 may contain other information to assist User One in an analysis of an incremental compile. As will be described in greater detail below with reference to FIG. 9, once User One has edited a local source file 114 and has compiled to produce processing results 116, User One may then return the edited local source file 114 to global source files 110, and may return processing results 116 to replace basis 112 in the global work space.

Similar to User One work space 104, User Two work space 106 includes a local copy of a source file 120, processing results 122 and a report file 124. User Three work space 108 includes local copies of source files 126, processing results 128 and a report file 130. As will be explained in greater detail below, each of any number of users may download and locally edit any number of project source files in their own work space, perform a compilation and view a local version of their own processing results through their own report files. Basis 112 is present in the global work space, however, each user has a read-only view of basis 112 in order to compare their own processing results with the latest basis. Each user may also retrieve older versions of particular files in order to compile these files into their own specific design that produces a unique set of processing results for that user. In this fashion, multiple engineers may work upon a complex PLD design at the same time.

As referred to above in FIG. 3, a user may perform an incremental compile of project source files in order to produce processing results without the need to completely recompile all project source files, a potentially lengthy proposition. Although incremental compilation may be used in a variety of scenarios, one specific technique for incremental compilation is described below with reference to FIGS. 17, 18, 19A and 19B.

Development Examples

Figure 4:
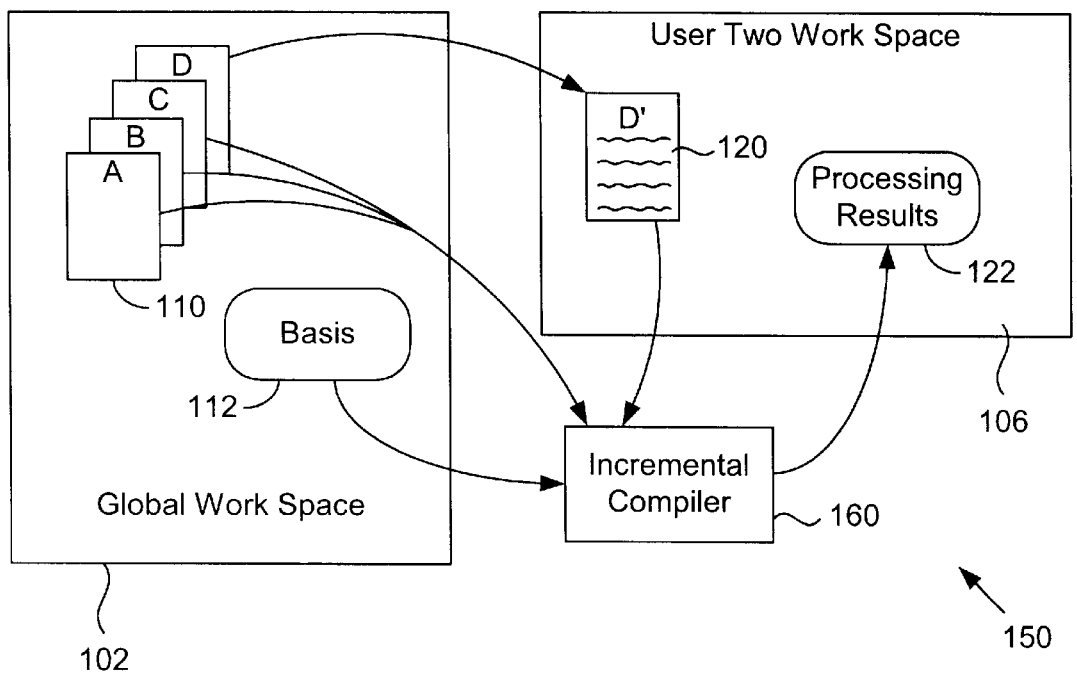
FIG. 4 illustrates a development scenario in which a user edits and compiles a file.

FIGS. 4 through 7 illustrate an embodiment of the invention in which an incremental compiler is used to help coordinate the development work of multiple engineers. FIG. 4 shows a development scenario 150 in which a user edits a particular source file. Shown is global work space 102, User Two work space 106 and an incremental compiler 160. Global work space 102 includes source files A, B, C, and D 110, and a basis 112 that has been derived from a previous compilation of source files 110.

User work space 106 includes a downloaded file D' 120 and processing results 122. In this scenario, the user has downloaded file D from the global work space and has edited the file in order to produce file D'. In order to incorporate these changes to file D, and to test the modifications, the user need not recompile the entire design but need only perform an incremental compile. Incremental compiler 160 takes basis 112, the source files A, B, C, and modified source file D' from user work space 106 in order to produce processing results 122. It should be appreciated that incremental compiler 160 is not performing a complete recompile of all of the source files, but is using basis 112 and modified file D' in order to produce processing results reflecting changes made to file D. This process is far less time-consuming than a complete recompile of all project source files.

Figure 5:
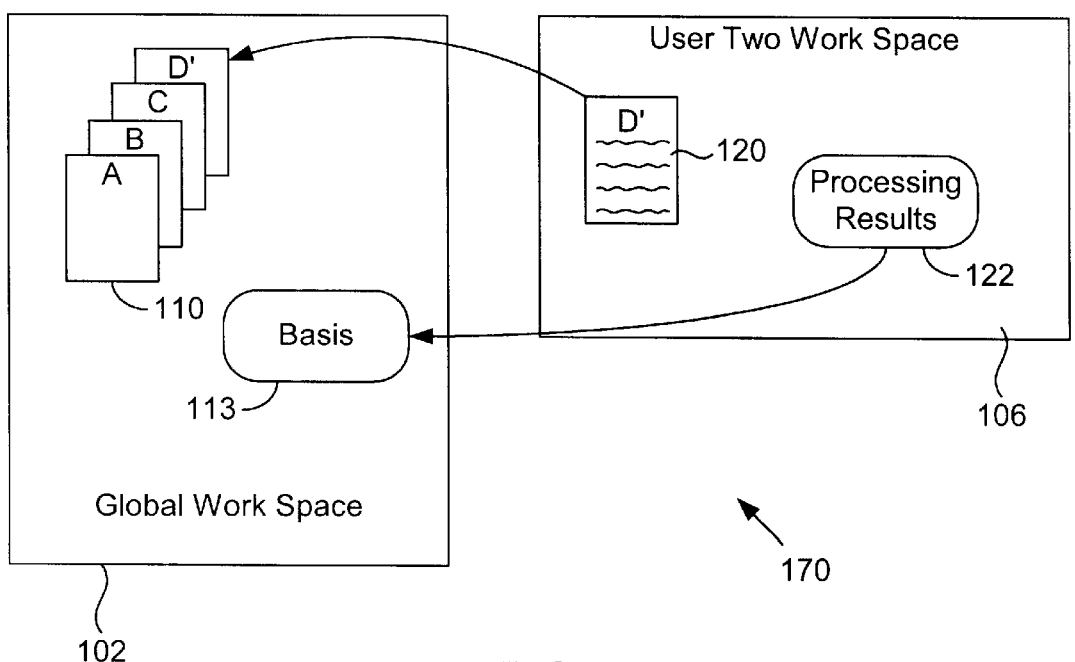
FIG. 5 illustrates a development scenario in which a user replaces a file and results.

FIG. 5 shows a development scenario 170 in which a user is replacing a file and processing results after achieving a satisfactory outcome. Shown are global work space 102 including source files 110 and a new basis 113. User work space 106 includes modified file D' 120 and processing results 122. In this scenario 170 following scenario 150 of FIG. 4, the user has achieved a satisfactory outcome with his modifications to file D' in that processing results 122 are satisfactory. User Two may then replace file D' into global work space 102 as one of the global source files 110 and overwrite the existing source file D. At the same time, User Two may also replace processing results 122 back into the global work space as a new basis 113.

Because processing results 122 reflect results due to modification of file D', it is preferable that any locally modified files such as file D' be placed back into the global source files 110 whenever processing results 122 replace the basis in the global work space. Alternatively, User Two need not replace any locally edited files or any new processing results produced, and may discard those edits and processing results. In an alternative embodiment, User Two may replace any locally modified files, but need not replace processing results into the global work space. This situation would be desirable if a current basis is desired to be kept the same so that additional engineers using the basis for incremental compiles are not faced with a constantly changing basis. However, once any locally modified files and the corresponding processing results are placed back into the global work space from a local user work space, then the global work space would then reflect the modifications that that particular engineer has made on the source files.

Figure 6:
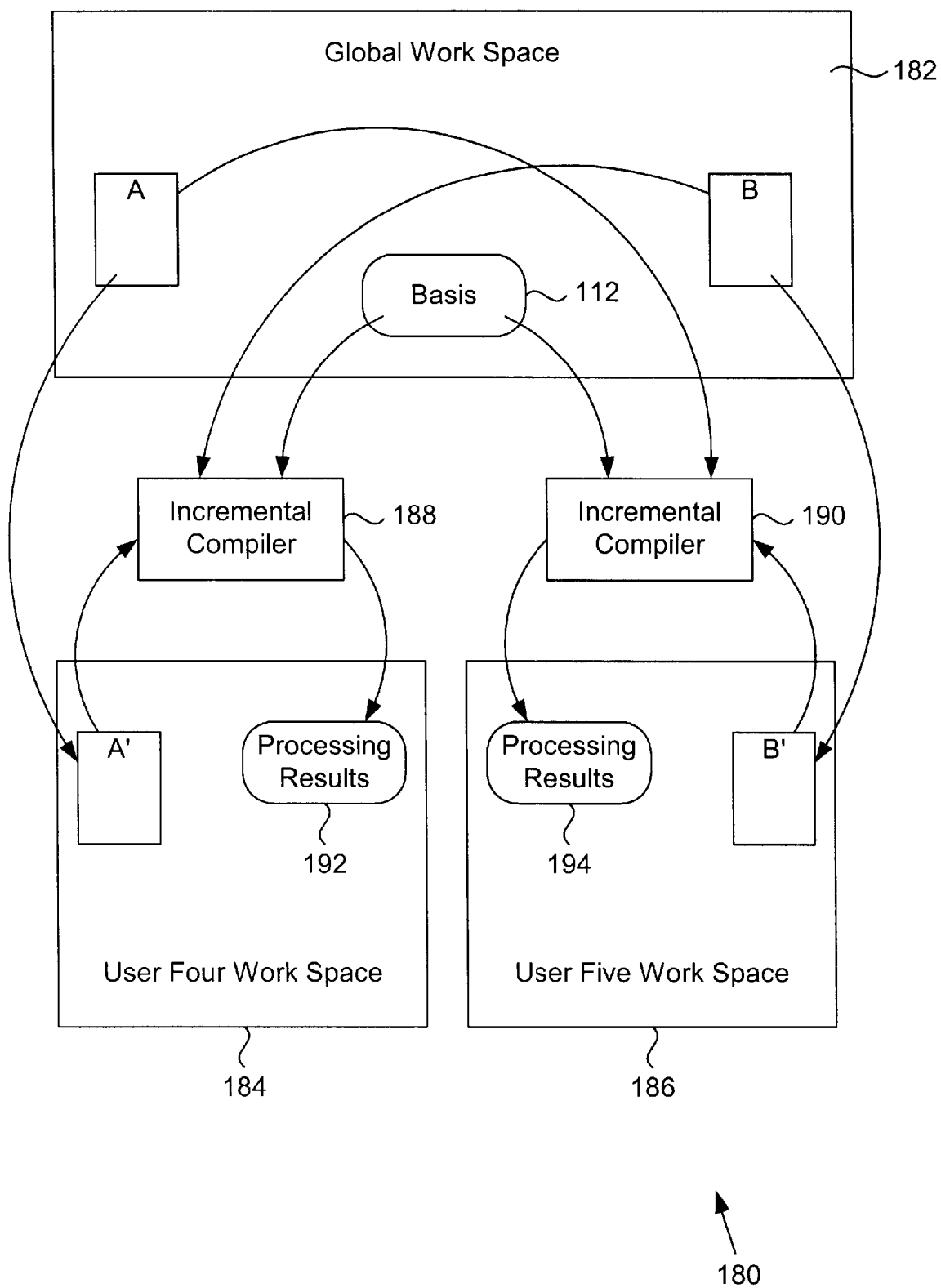
FIG. 6 illustrates a development scenario in which two different users are independently working on the project design at the same time.

FIG. 6 illustrates a further scenario 180 in which two different engineers are independently working on the project design at the same time. Scenario 180 shows a global work space 182, a User Four work space 184, a User Five work space 186, and incremental compilers 188 and 190. Global work space 182 includes source files A and B, and a previously compiled basis 112. In this scenario, User Four has downloaded file A for editing in order to produce file A'. In order to evaluate the results of this editing, User Four performs an incremental compile using incremental compiler 188. Incremental compiler 188 receives basis 112, file B from the global work space and file A' from the user work space in order to produce processing results 192. User Four may then view processing results 192 in order to determine the outcome of the modifications to file A.

More or less concurrently, User Five has downloaded file B for editing in order to produce file B'. In order to see the results of this editing, User Five performs an incremental compile using incremental compiler 190. Incremental compiler 190 receives basis 112, file A from the global work space and file B' from the user work space in order to produce processing results 194. User Five may then view processing results 194 in order to determine the outcome of the modifications to file B.

Both users Four and Five may use different copies of the same incremental compiler, may use different types of incremental compilers, or may use the same compiler at different times. Thus, both users Four and Five are allowed to edit source files of the project database at the same time, perform compilations and view their own results. Once a user is satisfied with the results achieved, any edited files and processing results obtained may be replaced in to the global work space as will now be explained with reference to FIG. 7.

Figure 7:
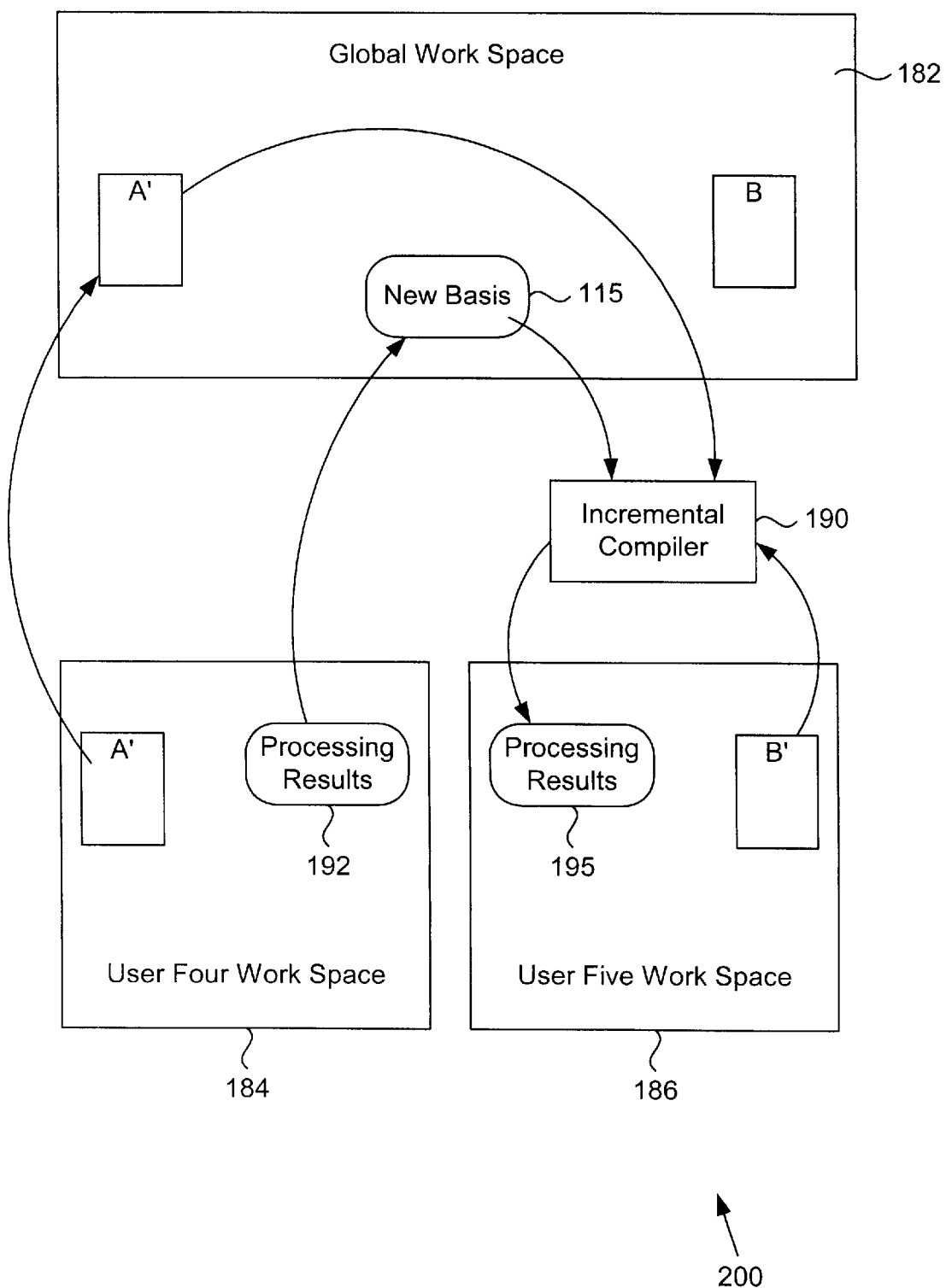
FIG. 7 illustrates a development scenario in which a replaced file in the global work space is used by a different user.

FIG. 7 illustrates a scenario 200 in which a user has replaced an edited file into the global work space which may then be used by a different user. Scenario 200 shows a global work space 182, user work spaces Four 184 and Five 186, and an incremental compiler 190. Global work space 182 includes a file A', a file B and a new basis 11 5. As shown previously in FIG. 6, User Four has downloaded and edited file A in order to produce file A'. Because of the satisfactory results, User Four now replaces file A' into the global work space along with processing results 192 which form a new basis 115 in the global work space 182.

In this situation, when User Five performs a compile using incremental compiler 190, the incremental compiler will receive the new basis 115, the new file A', as well as file B' from the user's local work space in order to produce different processing results 195. These processing results 195 are different from the results 194 achieved in FIG. 6 because User Four has replaced file A in the global work space with a modified file A' and because basis 115 is now different than previous basis 112. In this fashion, User Five can continue to work on a portion of the project database while receiving benefits of modifications made to other portions of the database by other engineers. Thus, the advantage in having User Four replace modified files as well as the basis is that other engineers will be able to see the results of the modifications made by User Four, as well as have access to the file that has been changed. Alternatively, User Four need not replace any files or basis, in which case the processing results for User Five would not change.

In an alternative embodiment, if User Five does not wish to have his results change as other engineers put back their changes, he can put himself in isolation mode. In isolation mode it is as if User Five has a private copy of the global workspace and performs incremental compilation from this copy of the workspace. It is not necessary to actually copy the entire workspace; the software manages the different versions of the files contained in the global workspace. For example, if User Four puts back edited file A' and processing results 192 into the global workspace, the software remembers that User Five is in isolation mode and ensures that User Five continues to receive old file A and old basis 112 instead of new file A' and new basis 115.

User Four might replace file A in the global work space with file A', but not replace basis 112 with processing results 192. In this fashion, User Five would not see the changes made to file A' by User Four upon an incremental compilation because the basis has not been changed. This embodiment would be advantageous if User Five wishes to work in an "isolation" mode and not be disturbed by changes made to the basis by other users. Thus, should it be desired that other users not be disturbed by modifications made by others, it is possible for files and/or processing results not to be replaced in the global work space. In one embodiment of the invention, one of a variety of file states are assigned to each file downloaded from the global work space to a user's local work space in order to coordinate development work by the engineers, as will explained below with reference to FIG. 8.

Version Control

Before entering into a discussion of possible file states from a local user's point of view, embodiments of version control (or revisions) will be discussed. Version control allows a user to preserve and restore previous versions of files which have been modified. In a single-user environment, this is useful to facilitate "backtracking" which is when the user wishes to "undo" a series of significant changes to a file. It is also useful to prevent accidental data loss. In a multi-user setting, it is useful for arbitrating access to shared files, so that two users may not accidentally edit the same file simultaneously.

It is contemplated that a wide variety of version control systems may be suitable for use with the present invention. By way of example, an EDA tool may have a complete version control system custom built into the central database. This will allow multiple versions of source files to be maintained as well as multiple versions of the processing operation results. Also, an EDA tool may have built in support for several of the major and most popular version control systems such as PVCS, RCS and SCCS. PVCS is popular on a PC type computer, but is also available on UNIX, whereas RCS and SCCS are standard UNIX version control systems. In addition, customers could integrate their own version control system into an EDA tool for use with the present invention.

The present invention as herein described works well with a version control system that has support for a linear list of versions (i.e., it does not need to have support for branching versions of files). With a linear list version control system, only the most recent version of a file can be edited. With this linear list, it is possible to bring an old version to the end of the list and to thus, undo all the edits between the most recent version and the old version. However, with linear lists, it is not possible to edit the old version and the newest version at the same time since this would require branching at the old version revision. It is contemplated that the present invention is also suitable for use with version control systems that allow for branching versions of files.

A version control system also preferably provides the features of checkpoints and rollbacks. When the user issues a checkpoint command, all current versions of all files are labeled and preserved by the system. Through the use of a rollback, a user can restore the state of the project to a previous state. The user can go back to these checkpoint states to use or view previous processing operation results or to use or view a previous version of a specific file. A given user can see local checkpoints that are created when that user compiled their design, and can see global checkpoints that are created when any user puts files back into the global workplace. The use of global checkpoints creates a checkpoint visible to all users, and hence its name. One difference between a local and a global checkpoint is that a local checkpoint is only available to the user who created it, while a global checkpoint is available to all users. Both kinds of checkpoints can be created automatically, and if the label is not named by the user then they are identified with a date-time stamp. Alternatively, users can manually create checkpoints.

It is often useful for a user to be able to return to a previous version of the source files and processing operation results. This return to a previous version is called a rollback. This previous version may have provided better results than what the user is currently achieving, or the previous version may have had fewer bugs than the current version.

When a user requests a rollback to a given checkpoint, the source files for the design are automatically checked out and "edited" by the EDA tool in order to match the state the files were in at the time of the checkpoint. If the user likes the results of this rollback, they can put the results of these automatic edits back into the global workspace, just as they would normally. The user may also put back the compiler database of this rollback state. Returning these edits and compiler database creates updated source files and an updated compiler database, all of which are now visible to all other users. Additionally, a user can roll back an individual file, instead of rolling back the entire state of the design. In this case, the individual file itself is changed but all else is left in its current state.

When version control is being used, files from one user's point of view may have the following states: default, locked, owned-write and owned-read only, although other file states are possible. These file states will now be explained in more detail with reference to FIGS. 8 through 11.

User File States

Figures 8, 9:
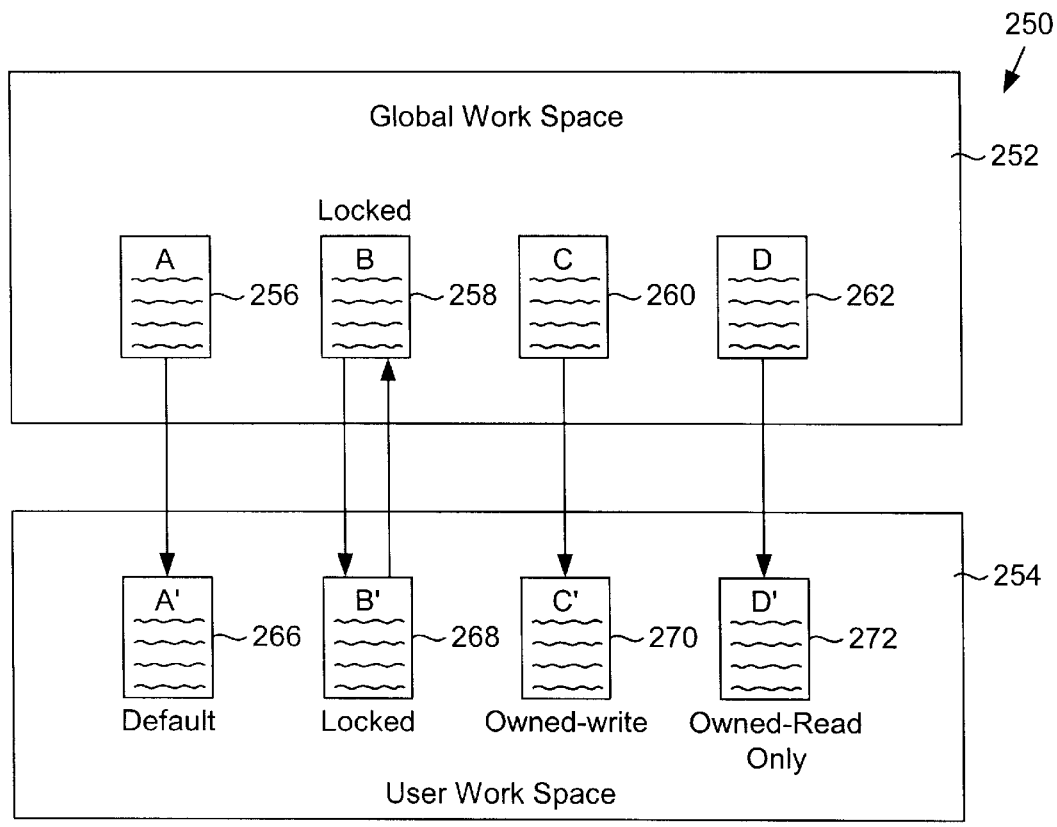
FIG. 8 illustrates a local user work space having a variety of source files from the global work space in various states.
FIG. 9 is a table illustrating options associated with each of various states available for source files in a local work space according to one embodiment of the present invention.

In one embodiment of the invention, source files transferred from a global work space 252 to a user work space 254 have a variety of states has shown in scenario 250 of FIG. 8. Global work space 252 includes source file A 256, file B 258, file C 260 and file D 262. User work space 254 includes transferred copies of these source files in the form of file A' 266, file B' 268, file C' 270 and file D' 272. In this illustrative example, each of these local files has been assigned a different state by the user. Of course, not all source files need be transferred to a local work space, and different source files may have the same state.

File A' 266 in user work space 254 is in a default state meaning that the file is read-only by the user and that any new versions of file A 256 in the global work space are automatically retrieved and transferred to the user work space. Thus, the contents of file A and file A' are identical. Thus, a default state allows a user to see the current versions of a global source file, but does not allow the user to edit that file. This default state is useful, for example, if another user is currently editing a particular file yet other users need to be able to read the file if it is changed. By placing a local file in a default state, the source file is retrieved automatically into a local user's work space. A global source file can be retrieved automatically at many different times, for example, it may be retrieved when the local file is opened by the user, when the user issues a compile command, or at any other suitable time.

File B' 268 is in a locked state meaning that the user has transferred the latest version of file B 258 from the global work space in order to edit it. Thus, the user may perform any editing upon file B' 268 and may also check this file back into the global work space, thus overwriting and updating file B 258 in the global work space. This locked state assigned to file B' 268 by the local user is reflected back to the global work space corresponding to file B 258 so that this file may not be checked out and edited by another user at the same time. A locked state supports users who wish to exclusively edit a file that eventually will be shared with other users.

If a user wishes to read or edit any version of a source file, an owned state may be used. File C' 270 is in an owned-write state meaning that any version of file C 260 from the global work space may be transferred to a user work space, and the user may then make any changes to file C' 270, but may not check file C' back into the global work space. This state is useful if another user has already checked out and is editing file C, but the current user of work space 254 still wishes to make changes to file C in order to see how those changes may affect his design. However, a file edited in an owned-write state may not be checked back in to the global work space.

File D' 272 is in an owned-read only state meaning that any version of file D 262 may be transferred from the global work space to the user work space. However, file D' 272 may not be written to, may only be read. Having a file in the owned-read only state prevents any accidental writing to the file, and is useful if a user does not wish a file to be automatically updated. The isolation mode mentioned above can be achieved by changing all files that are in default state to owned-read only state.

FIG. 9 is a table 300 illustrating options associated with each of these particular states according to one embodiment of the present invention. It should be appreciated that a wide variety of options, parameters and settings may be associated with each state, and that table 300 presents one embodiment by way of example. Table 300 includes a column 302 listing a variety of states that may be assigned to a transferred file existing in a user's local work space. For each of these states, column 304 indicates whether that local file may be written to, column 306 indicates whether that local file may be checked back into that global work space, column 308 indicates which version of the file may be transferred and column 310 indicates whether source files may be automatically retrieved from the global work space to the user's local work space.

Table 300 has rows indicating a variety of states suitable for use in one embodiment of the present invention. It should be appreciated that a wide variety of other states may also be used with the present invention. As described above in FIG. 8, included are a default state 320, a locked state 322, and owned-write state 324 and an owned-read only state 326. In default state 320, the local file that has been retrieved from the global work space may not be written to, may not be checked back into the global work space, and the latest version of that file is automatically retrieved from that global work space and transferred to the user's local work space. In locked state 322, the local file that has been transferred to the user's work space may be written to and may be checked back into the global work space, but only the latest version of that file may be edited. In this locked state, automatic retrieval is not applicable since the latest version of that file in the global workspace is locked and cannot be edited or changed by anyone until the user who has the file locked checks it back into the global workspace.

The owned-write state 324 allows the local file to be edited, but does not allow that file to be checked back into the global work space. Any version of that file may be transferred and edited locally, but the source file is not automatically retrieved. In the owned-read only state 326, any version of the file may be transferred to the local work space, but the local file may not be written to and automatic retrieval is not available. Other states for local files within a user work space that provide for a variety of other options are also contemplated.

Figure 10:
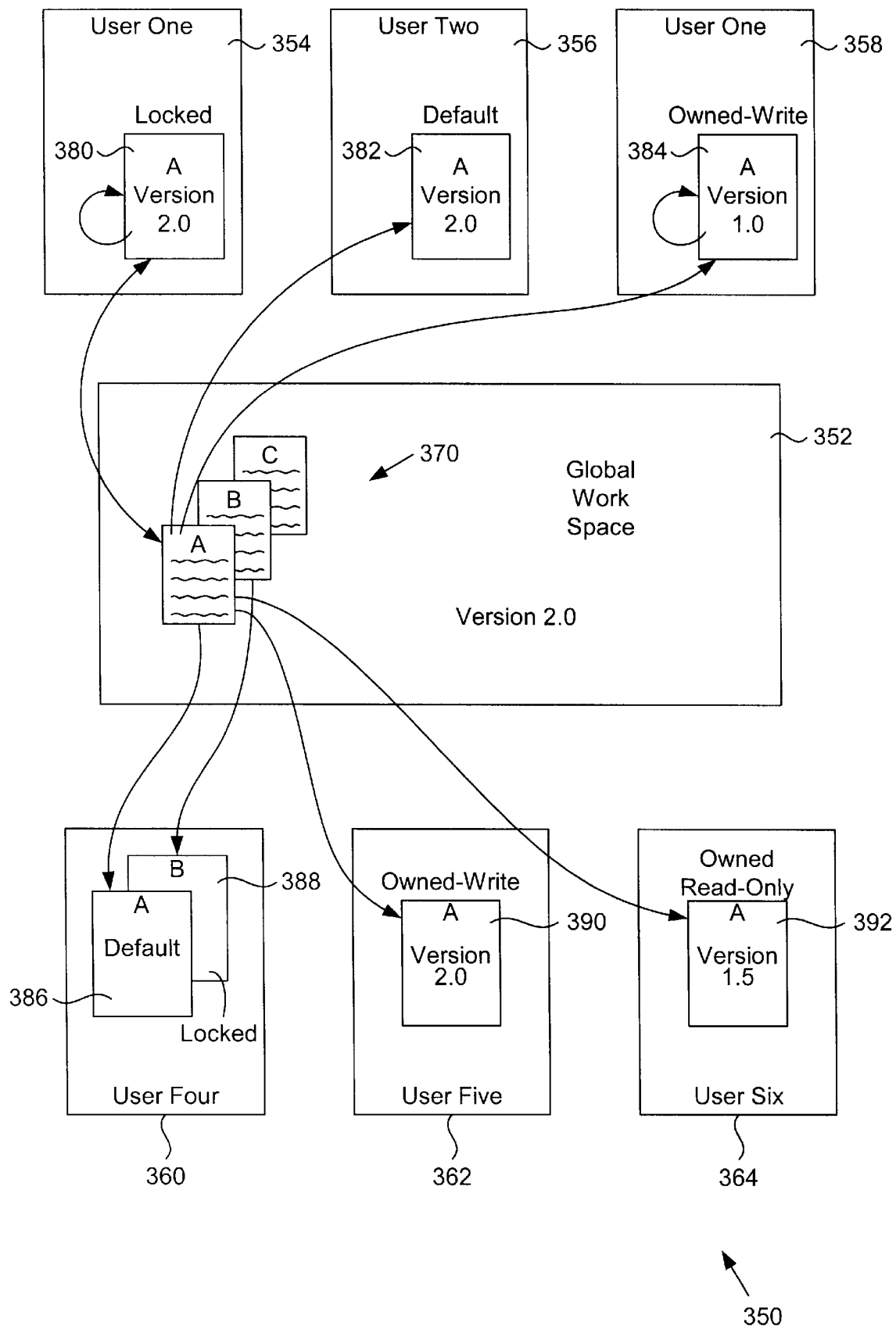
FIG. 10 illustrates a development scenario in which multiple users are jointly developing a design for a programmable logic device.

FIG. 10 further illustrates the use of different file states through a scenario 350 in which multiple users are jointly developing a design for a PLD. Scenario 350 includes a global work space 352 and local user work spaces for a User One 354, a User Two 356, a User Three 358, a User Four 360, a User Five 362, and a User Six 364. Global work space 352 includes source files 370 which include files A, B, and C. In this example, version 2.0 is the latest available version for these project source files, although through a suitable version control system any previous versions of a particular source file are also available from the global work space.

In this example, User One has transferred file A 380 to his local work space 354. User One has placed the latest version 2.0 of file A in a locked state indicating that for the time being only User One may edit file A and may check file A back into the global work space when editing is finished. User Two has also transferred file A 382 to his local work space 356 and has assigned a default state to file A so that the latest version is automatically retrieved from the global work space.

User Three has transferred file A 384 version 1.0 to his local work space 358 in order to make changes to that older version of file A. In this owned-write state, file A 384 may not be transferred back to the global work space. User Three may now edit and compile this older version of file A in order to improve upon aspects of the PLD design related to version 1.0 of file A. User Four has transferred both file A 386 and file B 388 to his local work space 360. File A has been placed in a default state similar to that placed on file A by User Two, meaning that User Four will also automatically retrieve the latest version of file A from the global work space. User Four is also currently editing file B and thus has placed a locked state upon file B. The locked states for file A (from User One) and file B (from User Four) are both reflected in the global work space in the form of a flag, set bit, Boolean, field, or other indicator in the source file database to prevent other users from editing these files while they are locked.

User Five has also downloaded file A 390 and has placed it in an owned-write state as has User Three. However, in this example, User Five has transferred version 2.0 of file A. Similarly, User Six has transferred file A 392 version 1.5 to his local work space 364 and has placed this file in an owned-read only state. User Six may now compile his own separate version of the project design using version 1.5 of file A. Thus, as illustrated in FIG. 10, it should be appreciated that multiple engineers may simultaneously be editing and/or reading the same file or different versions of the same file through the use of the present invention.

Figure 11:
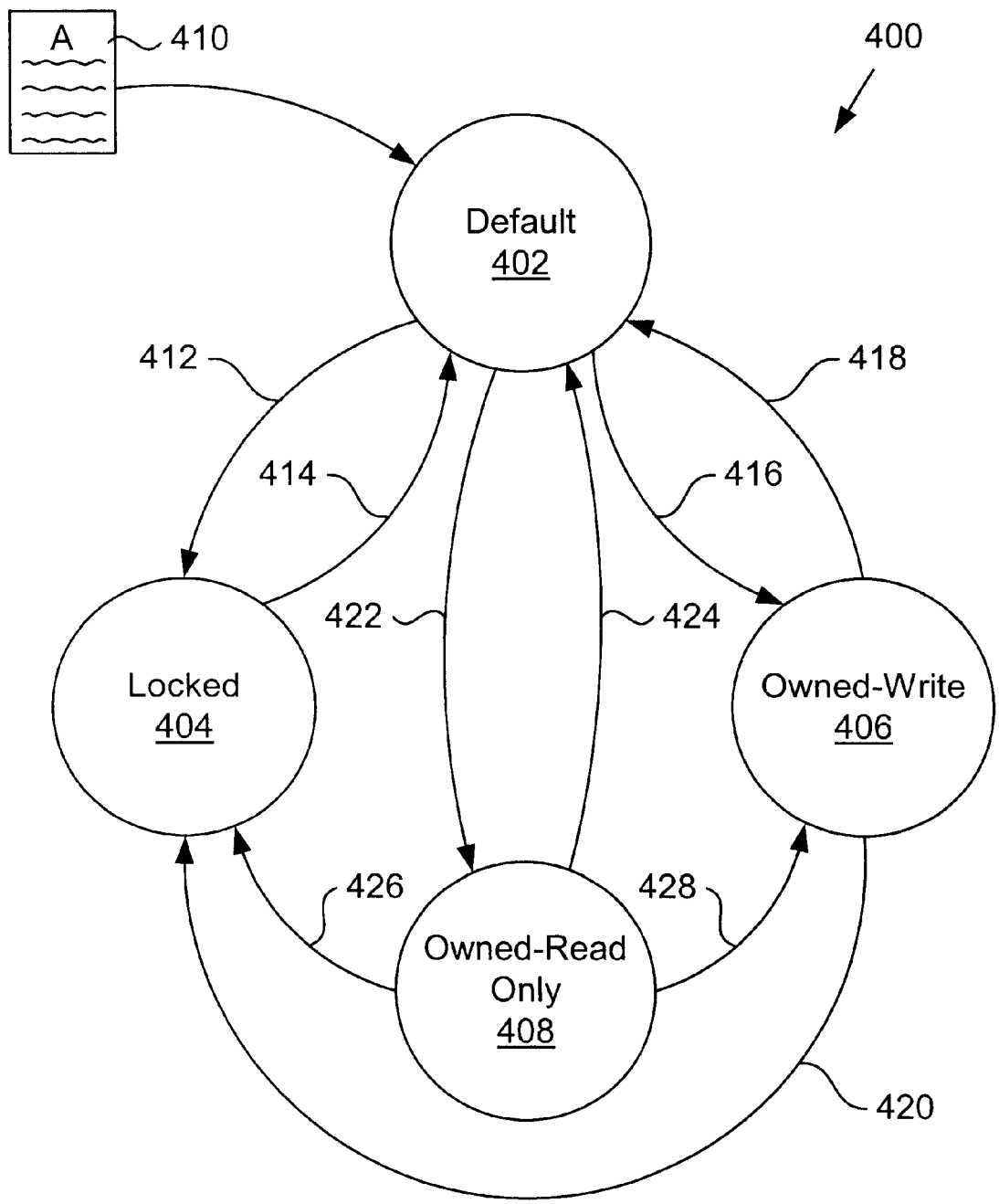
FIG. 11 is a file state diagram according to one embodiment of the present invention.

FIG. 11 is a file state diagram 400 for one embodiment of the present invention. This diagram reflects possible file states and transitions as viewed from a local user work space. The states in this embodiment include a default state 402, a locked state 404, an owned-write state 406, and an owned-read only state 408.

Initially, a file A 410 that has been transferred by a user to his own work space may be placed into a default state 402. A file may also be placed into a different state initially. When the user wishes to modify that file, the user performs a check out 412 in order to place the file into a locked state 404. Upon completion of modifications, a check in procedure 414 returns the file to a default state. From the default state, the user may also change 416 the file state into an owned-write state 406. Once the user has finished with the file, it may be returned 418 into a default state. Alternatively, from the owned-write state the user may perform a check out 420 in order to place the file into a locked state. From the default state 402, the user may also give a command 422 to place the file into an owned-read only state 408. From the read-only state, once the user has finished with the file, the file may be returned 424 to the default state. Alternatively, from the owned-read only state, the file may be changed 428 to an owned-write state or maybe checked out 426 to place it into a locked state. It should be appreciated that a wide variety of other states and possible states diagrams are suitable for use with the present invention.

Sharing of Assignment Information

Assignment information may also be shared in the context of a PLD design project using an embodiment of the present invention. Assignment information may take a wide variety of forms. By way of example, an assignment uses a hierarchical path to specify a particular piece of logic within the PLD design and to give some named attribute a value. For example, an assignment may be of the form: "/TOP/A/D/flip-flop X/set turbo=ON". In this example, "TOP", "A", and "D" represent functional blocks within a PLD design, flip-flop X is inside functional block D, and the complete path as specified by the listed blocks identifies a unique device within the design. This particular assignment is used to set the attribute "turbo speed" of flip-flop X to "ON". Many other types of assignments, paths, attributes and values are possible. For example, an assignment may be used to assign pins, may be used to control minimization, may be used to assign cliques and to group objects, etc.

Assignments may be shared amongst multiple engineers in a wide variety of manners. By way of example, a single global project assignment file may be used to hold all of the assignments for a particular design. Although simple to implement, only one user may edit this file at a time, and the file could be very large since thousands of assignments per design is common. In another example, each project source file may have an associated parallel assignment file. In a preferred embodiment of the invention, assignments are stored globally in an assignment database and each assignment is stored as a record in that database as will now be explained with reference to FIG. 12.

Figure 12:
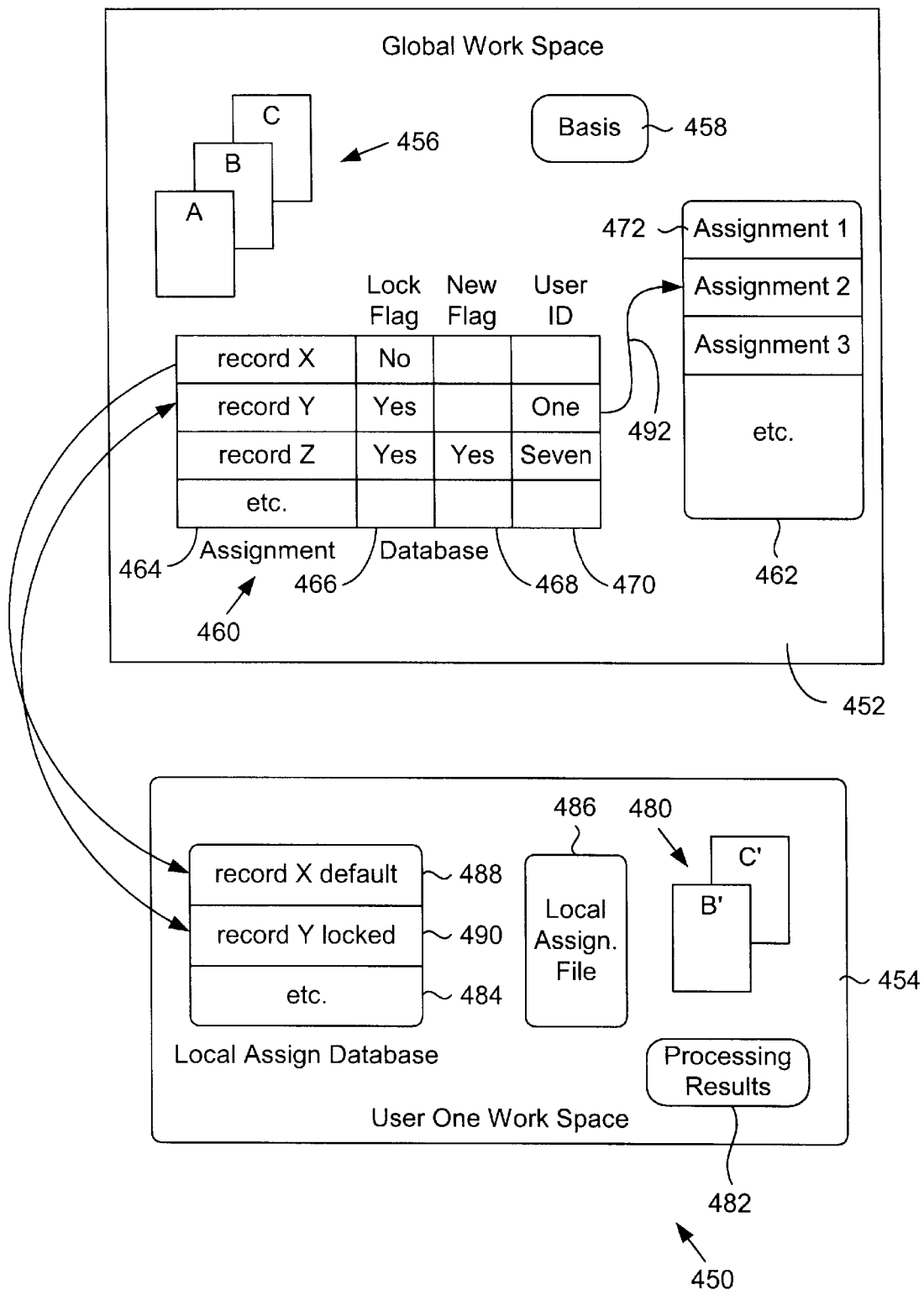
FIG. 12 illustrates a development scenario in which a user modifies assignments in the context of a design project.

FIG. 12 shows a scenario 450 in which a user is modifying assignments in the context of a design project. Scenario 450 includes a global work space 452 and a User One work space 454. Global work space 452 includes project source files 456, a basis 458, a binary assignment database 460 and an ASCII assignment file 462. Assignment database 460 has a column of assignment records 464, a lock flag column 466, a new flag column 468 and a user ID column 470.

Assignment database 460 is a binary database that may be implemented in a wide variety of manners. By way of example, database 460 may be a custom built database or may be an off-the-shelf database product. In one embodiment, database 460 is implemented using "Object Store" software available from Object Design Inc. of Santa Clara, Calif. Assignment database 460 stores all of the assignment information for a particular design project by storing each assignment as a record in the database. The lock flag of column 466 of the database indicates whether or not a user has checked out an assignment in order to modify it and has thus locked the assignment. This locked state may be implemented in a similar fashion as described above with reference to the project source files. The new flag of column 468 indicates whether a user has created a new assignment. If a user has created a new assignment, the assignment will also be locked and would not be able to be automatically downloaded by another user. The user ID column 470 indicates which particular user has either locked an assignment or has created a new assignment.

Assignment file 462 is an ASCII text file located on disk in one embodiment. This file 462 contains a user readable version of the current state of assignments of the project, and may show the hierarchical path for each assignment. File 462 is useful for user review of current assignments and may also serve as a backup in case of loss or damage to assignment database 460. For a single user development of a project design, file 462 may be allowed to be edited by the user in order to change assignments. As assignments are changed in database 460, file 462 is automatically updated with the latest change.

User One work space 454 includes downloaded versions of project source files 480, processing results 482, a local assignment database 484 and a local assignment file 486. Local database 484 is a binary database that may be implemented in the same manner as global database 460. Database 484 contains in record form the assignments that User One is currently viewing or editing. Local file 486 is similar to global file 462 in that file 486 contains an updated user readable version of local database 484. In this example, User One has transferred record X 488 to the local work space and has placed record X 488 into a default state so that any changes to record X in the global database 460 will automatically be retrieved to update the user's local database 484. User One has also transferred and placed record Y 490 into a locked state in order to modify it. Once the user has finished modifying record Y, this record may then be checked back into the global database 460. Returning to global work space 452, record X in database 460 has a lock flag of NO because no user has locked it. Record Y has a lock flag of YES because User One has locked this assignment. Record Z has a new flag of YES and a lock flag of YES because a User Seven is in the process of creating this assignment.

Once User One has checked record Y back into global database 460, then automatically an update 492 occurs to update file 462 with the latest change to the global database 460. It should be appreciated that these assignments may also have a wide variety of other states. By way of example, these records may have states similar to those for the project source files discussed above. In this fashion, the multitude of assignments within a complex PLD design may be simultaneously edited by a multitude of engineers in a coordinated and efficient fashion. Now having illustrated graphically how project source files and assignments may be shared amongst multiple engineers, flow charts for implementing an embodiment of the invention will now be discussed.

Flow Chart Embodiments

Figure 13:
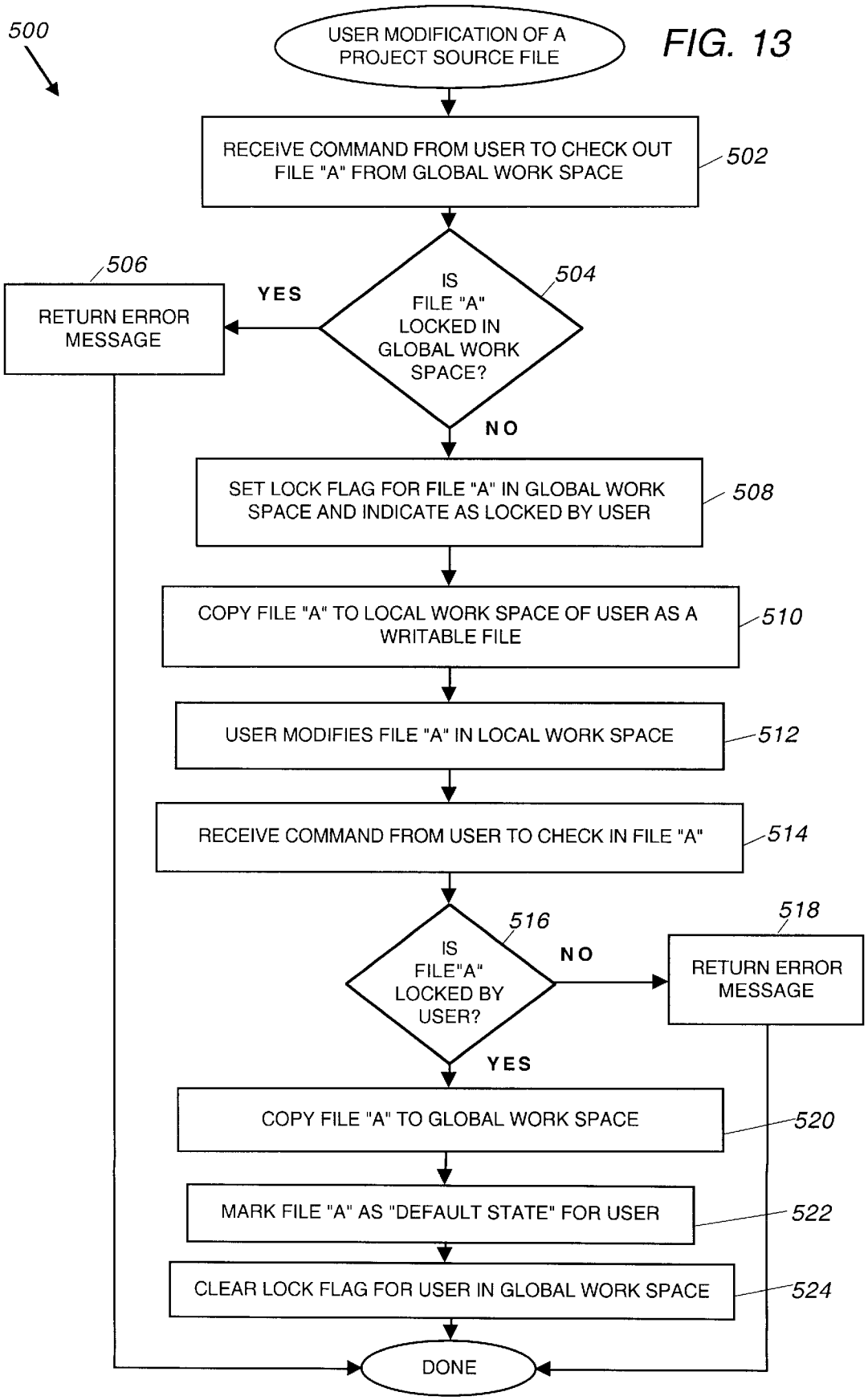
FIG. 13 is a flowchart illustrating a technique by which a user may modify a project source file using an embodiment of the present invention.

FIG. 13 is a flowchart 500 illustrating a technique by which a user may modify a project source file using an embodiment of the present invention. In step 502, the system receives a command from the user to check out file A from the global work space. Step 504 determines whether file A is currently locked in the global work space. If file A is currently locked, this indicates that another user is currently modifying file A. In this situation, the requesting user may not check out file A and in step 506 an error message is returned and the procedure is done.

However, if file A is not locked, then in step 508 a lock flag is set for file A in the global work space and file A is indicated as being locked by the user requesting modification. Next, in step 510 file A is copied to the local work space of the user as a file that may be written to. In step 512, the user is then able to modify file A in his local work space.

Once modifications are completed, the user issues a command to check in file A in step 514. Step 516 first determines whether file A has, in fact, been locked by the user requesting to check it in. If the user requesting that file A be checked in had not locked file A, then in step 518 an error message is returned and the procedure ends. However, if the user is the same, then in step 520 file A is copied back up to the global work space and rewrites the older version of file A. In step 522, file A is changed from a locked state for that user to a default state. Finally, in step 524, the lock flag for file A for that user is cleared from the global work space. In this way, users may modify source files in a project design in a coordinated fashion.

Figure 14:
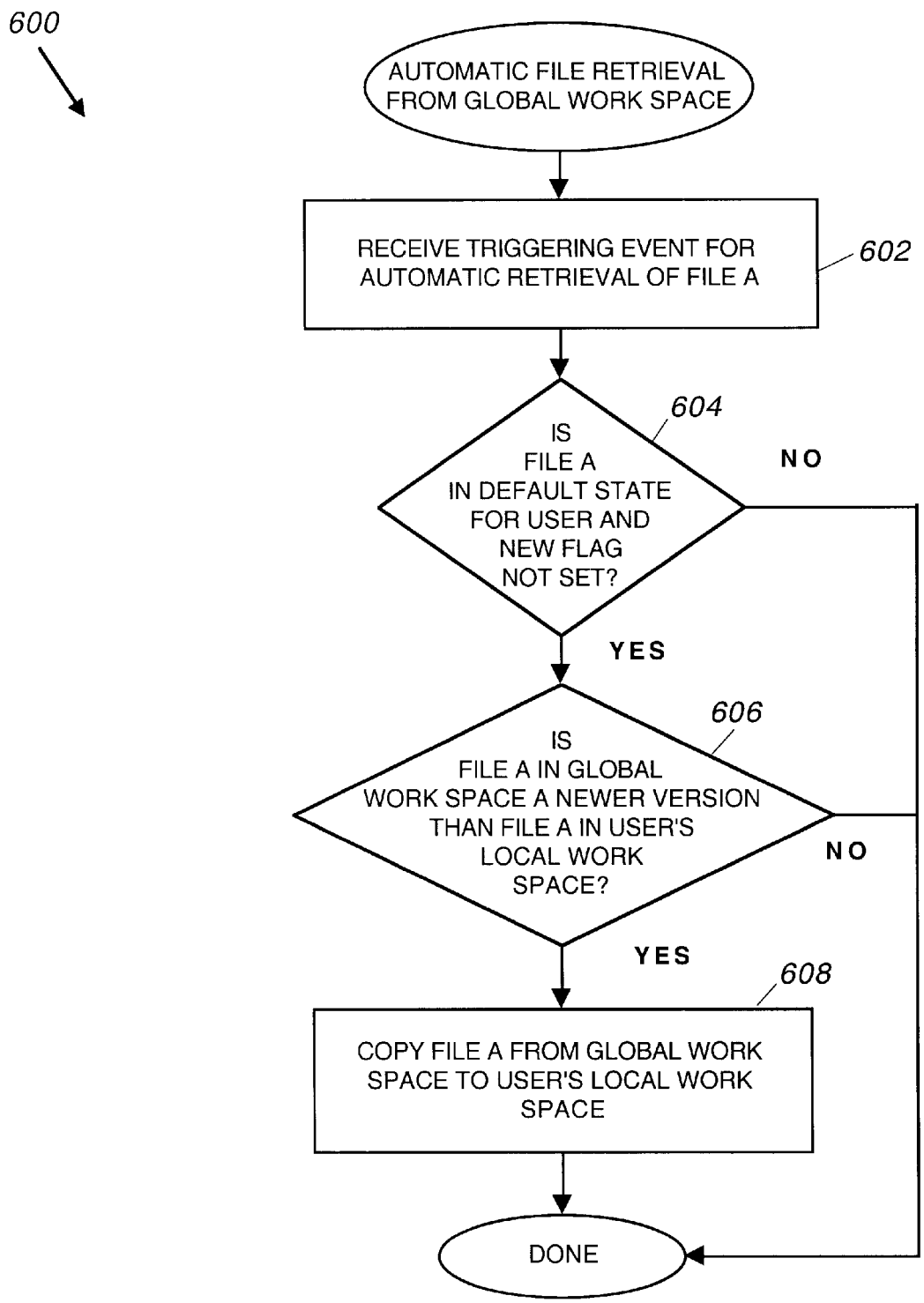
FIG. 14 is a flowchart illustrating a technique by which a source file may be automatically retrieved from a global work space to a local work space.

FIG. 14 is a flowchart 600 illustrating a technique by which a source file may be automatically retrieved from the global work space to a user's local work space. In step 602, a triggering event is received for the automatic retrieval of project source file A from the global work space to a user's local work space. A triggering event may take a wide variety of forms. By way of example, a triggering event may occur periodically such as every day or hour, may occur upon a compile, may occur upon opening file A, may occur upon notification from the global work space that file A has changed, or may occur in other fashions. Once the trigger has been received, then in step 604 it is determined whether file A is in fact in a default state for that user and that a new flag has not been set for file A. If file A is not in a default state for a particular user, then that file will not be automatically retrieved. Also, if another user has just created a new file A, this new file A may not have been transferred to the global work place at this time. In this situation, file A would not be automatically retrieved.

If the result is YES from step 604, then in step 606 it is determined whether the file A version in the global work space is a newer version than file A version in the user's local work space. If it is not, then file A will not be automatically retrieved. However, if the result is YES, then in step 608 file A from the global work space is copied automatically to the user's local work space. In this fashion, a local project source file in a default state is automatically updated with recent versions of that file from the global work space.

Figure 15:
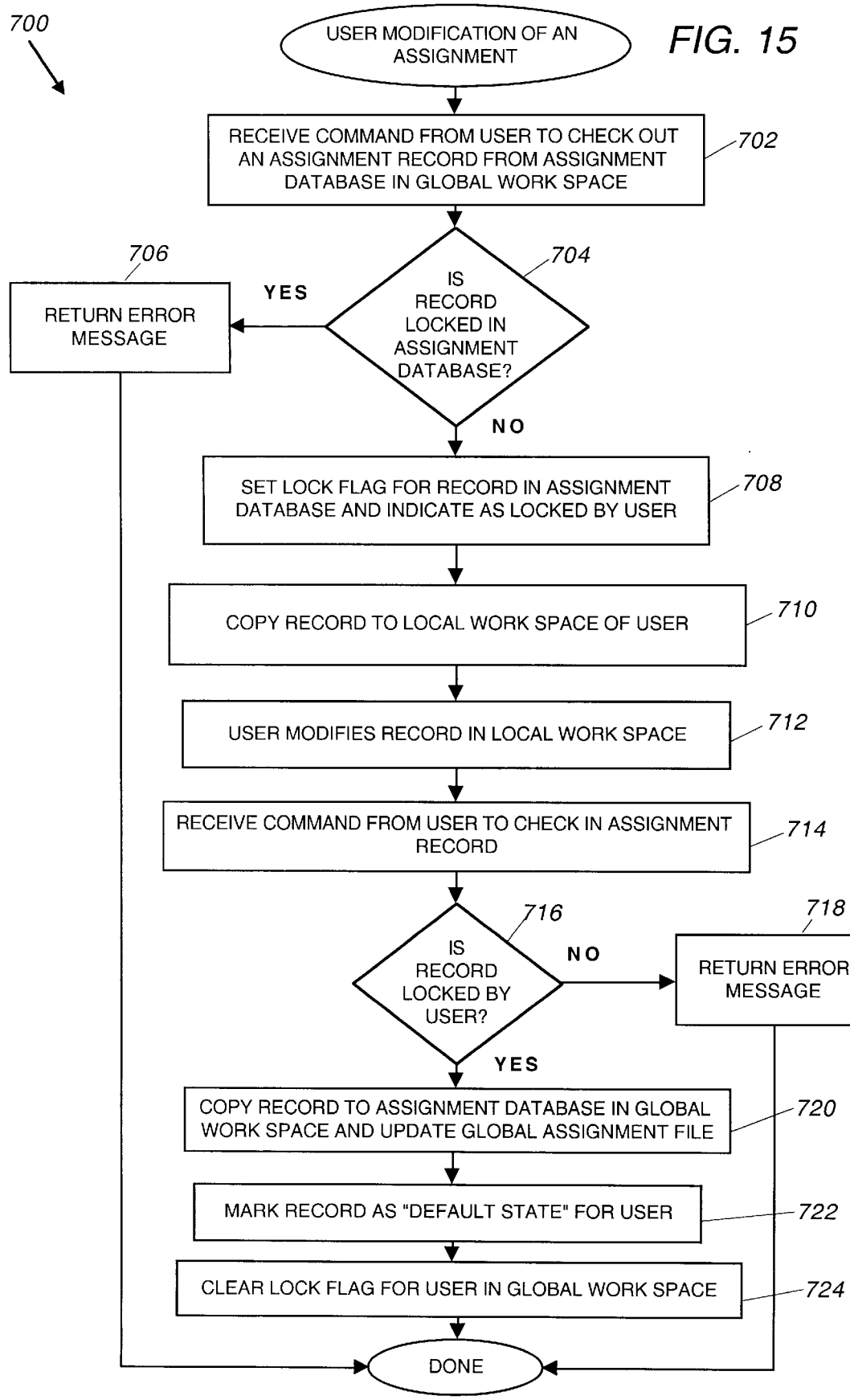
FIG. 15 is a flowchart illustrating a technique by which a user may modify an assignment of a project design.

FIG. 15 is a flowchart 700 illustrating a technique by which a user may modify an assignment of the project design. In step 702, the system receives a command from the user to check out an assignment record from the assignment database in the global work space. Step 704 determines whether the record is currently locked in the assignment database. If the record is currently locked, this indicates that another user is currently modifying the record. In this situation, the requesting user may not check out the record and in step 706 an error message is returned and the procedure is done.

However, if the record is not locked, then in step 708 a lock flag is set for the record in the assignment database and the record is indicated as being locked by the user requesting modification. Next, in step 710 the record is copied to the local work space of the user. In step 712, the user is then able to modify the record in his local work space.

Once modifications are completed, the user issues a command to check in the assignment record in step 714. Step 716 first determines whether the record has, in fact, been locked by the user requesting to check it in. If the user requesting that the record be checked in had not locked the record, then in step 718 an error message is returned and the procedure ends. However, if the user is the same, then in step 720 the record is copied back up to the assignment database in the global work space and overwrites the older version of the record. Automatically, the global ASCII assignment file is also updated. In step 722, the record is changed from a locked state for that user to a default state. Finally, in step 724, the lock flag for the record for that user is cleared from the assignment database in the global work space. In this way, users may modify assignment records in a project design in a coordinated fashion.

Figure 16:
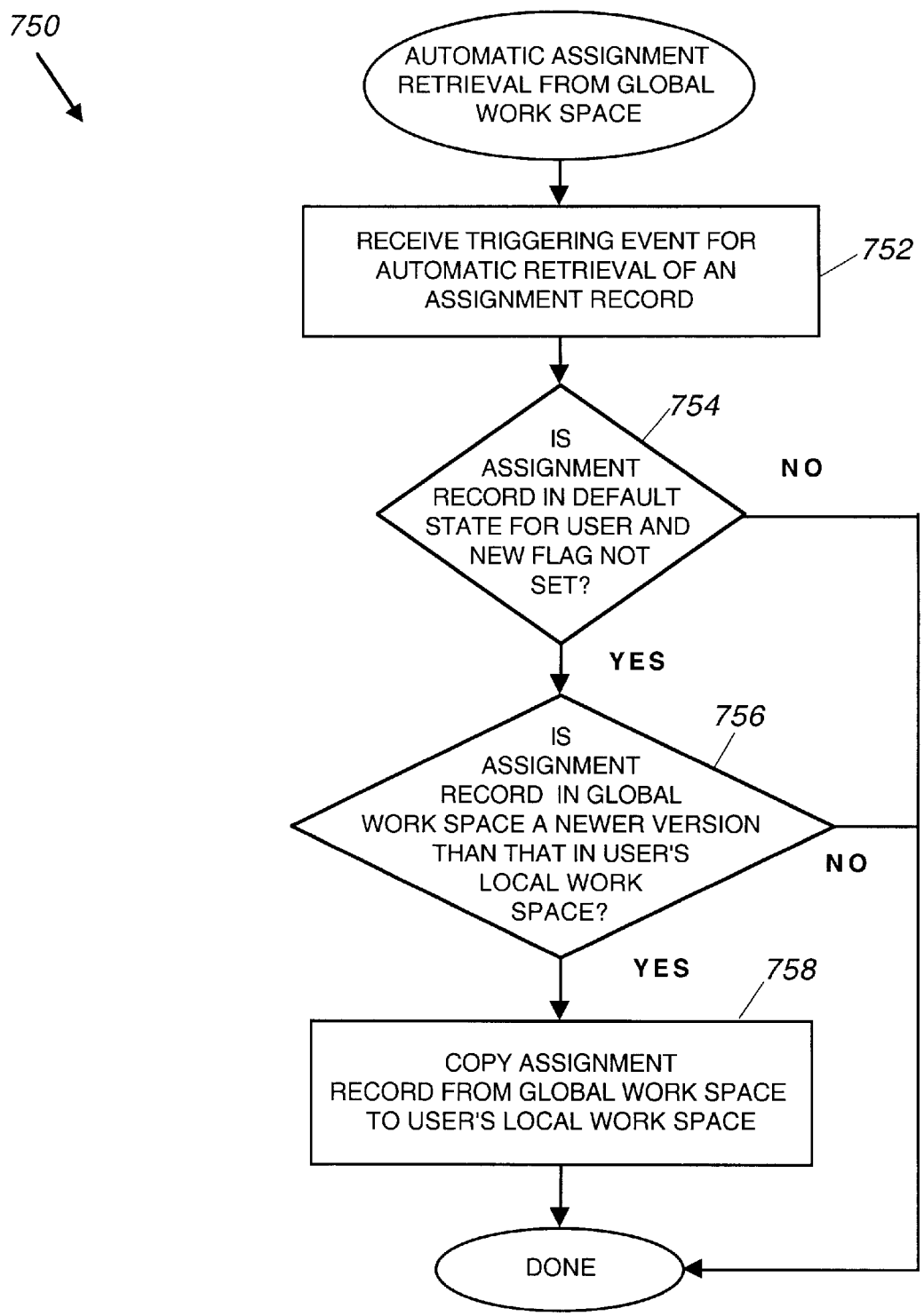
FIG. 16 is a flowchart illustrating a technique by which assignments in a global work space are automatically retrieved to a local work space.

FIG. 16 is a flowchart 750 illustrating a technique by which assignments in the global work space may be automatically retrieved to a user's local work space. In step 752, a triggering event is received for the automatic retrieval of an assignment record from the global work space to a user's local work space. A triggering event may take a wide variety of forms as discussed above in FIG. 14. Once the trigger has been received, then in step 754 it is determined whether the record is in fact in a default state for that user and that a new flag has not been set for the record. If the record is not in a default state for a particular user, then that record will not be automatically retrieved. Also, if another user has just created the record, this new record may not have been transferred to the global work place at this time. In this situation, the record would not be automatically retrieved.

If the result is YES from step 754, then in step 756 it is determined whether the record version in the global work space is a newer version than the record version in the user's local work space. If it is not, then the record will not be automatically retrieved. However, if the result is YES, then in step 758 the record from the global work space is copied automatically to the user's local work space. In this fashion, an assignment record in a default state is automatically updated with recent versions of that record from the global work space.

In similar fashion to the steps described above, a user may transfer a file to his own local work space in an owned-write state, may modify the file, perform a compilation, and view his own local processing results. Similarly, a user may transfer a file in an owned-read only state in order to use any versions of this file for compilation and viewing of processing results. Similar approaches may be used with assignment information.

Incremental Compilation

One technique to assist in the management of multiple engineers working on a single project and to reduce compilation time for large devices is incremental compilation. Incremental compilation is mentioned above with reference to various figures. In essence, incremental compilation involves using a previously compiled design such that only a fraction of that design must be recompiled after a user or design software makes one or more changes to the design. Incremental compilation includes at least two steps: (1) delineating a sphere of influence of user changes in a previously compiled design (the sphere of influence typically being defined within a netlist), and (2) recompiling the logic from within this sphere of influence into appropriate logic elements available within a target hardware device. To maximize efficiency, the compiler should limit recompile to a minimum region of the electronic design (and corresponding regions of a target hardware device) which is affected by the user's design change.

One suitable technique for delineating a sphere of influence of user changes to a previously compiled design (first step) involves a "netlist differencing" method in conjunction with a "sub-netlist identification" method. Netlist differencing identifies which nodes and/or nets of a new netlist have actually changed from a netlist of a previous design. Netlist differencing is described in more detail below. Because the effects of the user's changes propagate beyond those nodes/nets that were actually changed, the compiler uses an appropriate technique for expanding the changed portion of the design beyond the design entities identified by netlist differencing. One suitable technique for identifying the sphere of influence of the changes is the sub-netlist identification method which is described in more detail below. The changed portion of the design delineated by sub-netlist identification may resynthesized, remapped, and refit (second step). A fitting designed to minimize the use of fitting resources during incremental compile is described below.

Incremental compilation may be integrated in a conventional PLD design effort as follows. Initially, a full compile of an "original" design is performed. This full compile may be performed using traditional PLD compilation procedures. The procedure takes as an input an unsynthesized netlist representing a schematic of the user's design. The procedure outputs instructions for programming a PLD target hardware device.

This netlist is used to describe the functionality of a digital circuit design that can be implemented on a programmable logic device or other target hardware device. The netlist is represented as a hierarchical collection of gates, state machines, high level constructs such as counters or adders, or any other means of defining a collection of outputs based on a collection of inputs. The nodes of the netlist (gates, state machines, etc.) are connected together via nets. Each of these nets is associated with a named digital signal. A logic synthesizer module of a compiler takes this netlist and simplifies its gate representation in a process referred to as synthesis.

The process of simplifying a gate representation consists of performing Boolean manipulations on the netlist: removing redundant gates or replacing the gates of a sub-network of the design with an equivalent network of newly generated "synthesized gates." These synthesized gates do not necessarily have a one-to-one correspondence to any single gate in the original netlist.

Figure 17:
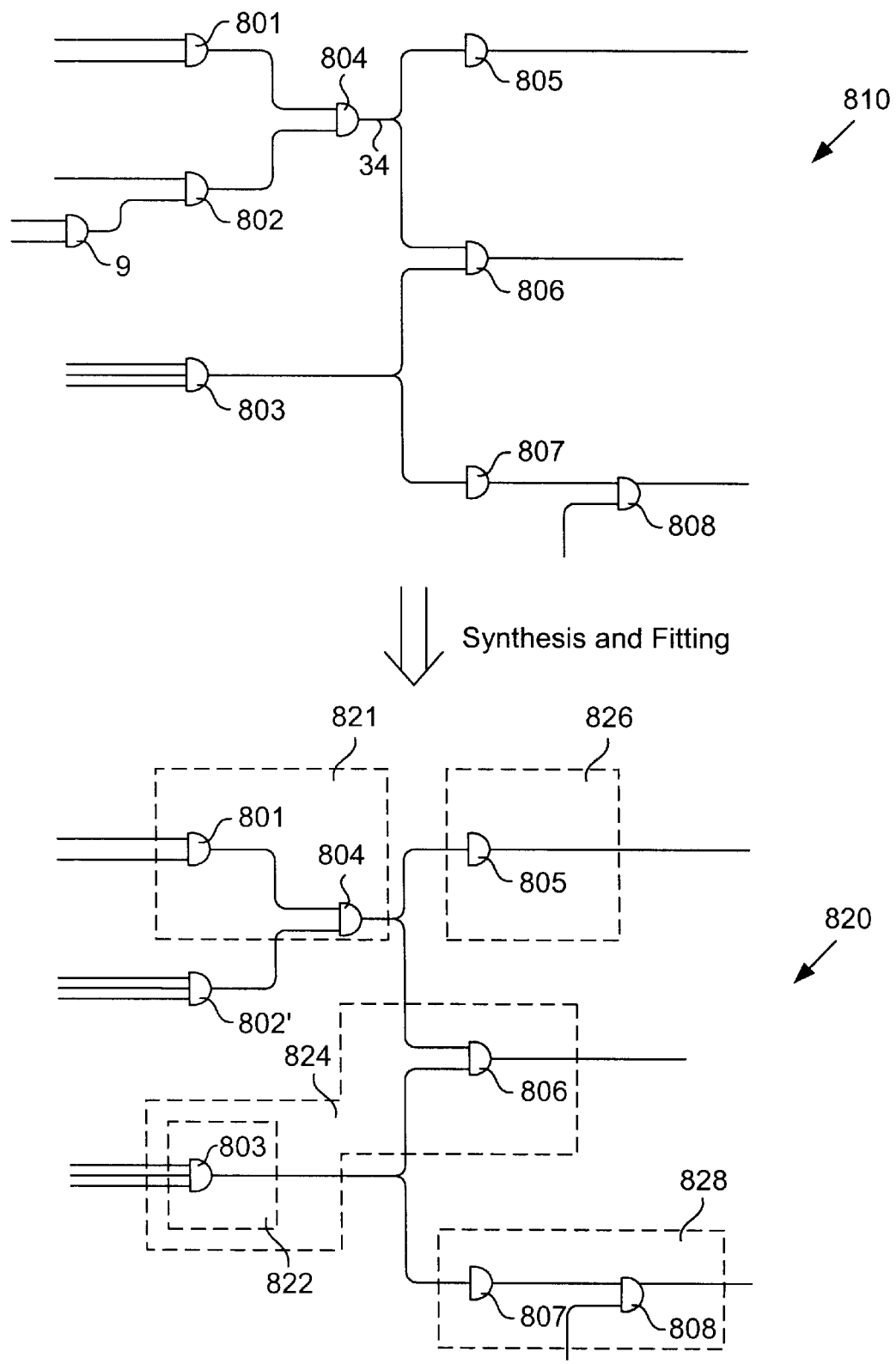
FIG. 17 is an idealized representation illustrating how a pre-synthesis netlist may be synthesized and mapped onto hardware logic elements.

FIG. 17 presents a hypothetical generic netlist in two phases: an unsynthesized phase and a synthesized (and mapped) phase. An unsynthesized netlist 810 includes a collection of generic gates or nodes connected by nets. A synthesized netlist 820 is obtained by synthesizing netlist 810. The gates of synthesized netlist 820 are mapped into various logic cells (which will ultimately be placed in logic elements of a target hardware device) including logic cells 821, 822, 824, 826, and 828 delineated by dotted boundary lines.

In this hypothetical example, during synthesis, a two-input logic gate 802 and another two-input logic gate 809 are combined to form a three-input logic gate 802'. Otherwise, all gates and the connections therebetween are maintained in the pre- and post-synthesis netlists 810 and 820. These unchanged generic gates include a gate 801, a gate 803, a gate 804, a gate 805, a gate 806, a gate 807, and a gate 808.

In the synthesized netlist 820, logic gates 801 and 804 are mapped to logic cell 821 of the target hardware device. Logic gate 803 is mapped, by itself, to logic cell 822. Logic gate 803 and logic gate 806 together reside in logic cell 824. Logic gate 805 resides, by itself, in logic cell 826. Finally, logic gates 807 and 808 reside in logic cell 828.

After the full compilation is concluded, the user may decide to make a change to the overall design which was previously subject to the full compilation. To reduce the time required to compile the user's changed design, incremental compilation may be applied. One goal of incremental compilation is to flag the fewest possible gates as changed (modified) gates for incremental recompilation. Thus, the changed electronic design can be synthesized and mapped and then fit to the hardware with a minimal disruption in the existing compiled design. However, it must be ensured that the newly defined electronic design accurately implements the user's changes.

Figure 18:
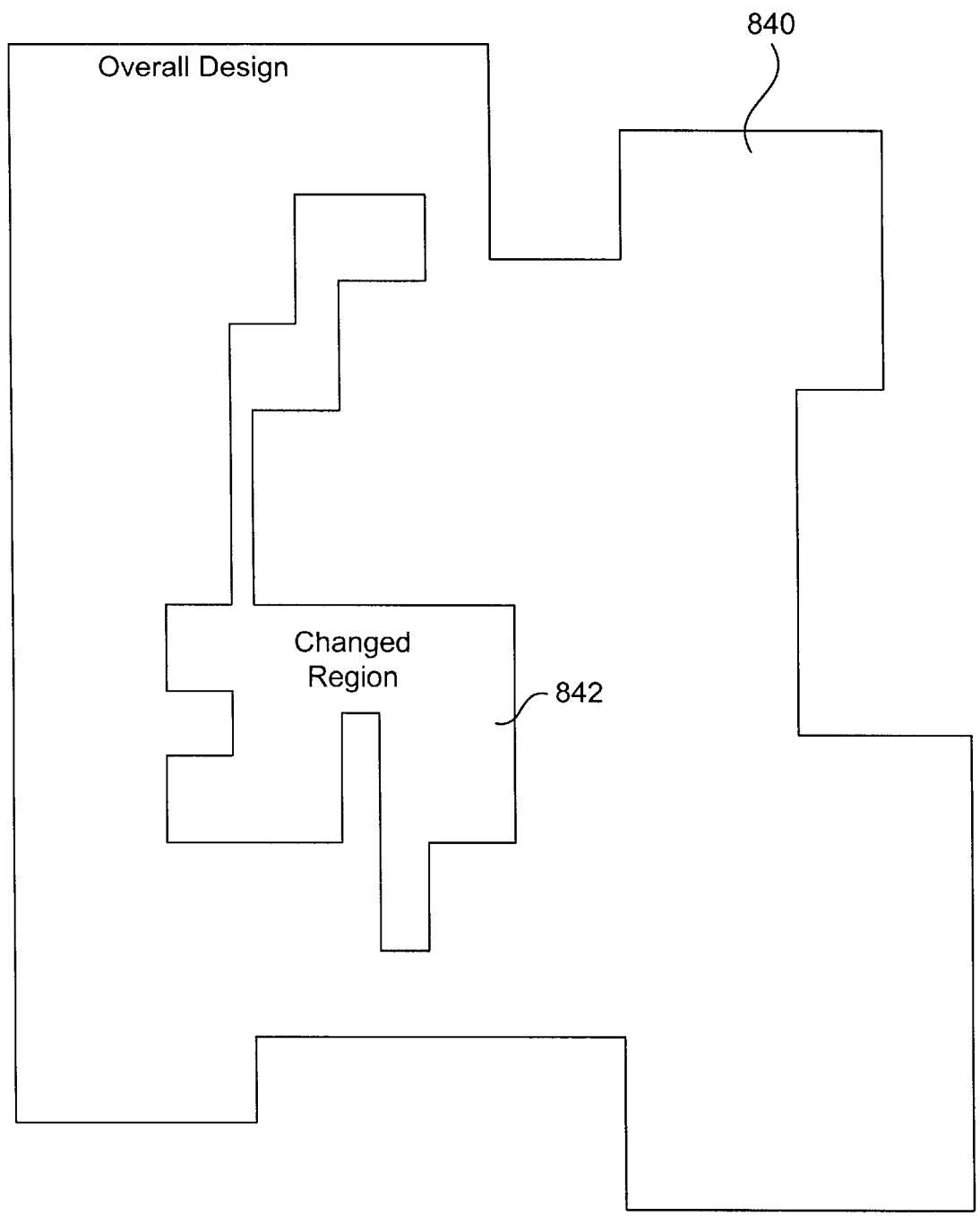
FIG. 18 is an idealized representation of an electronic design showing the boundaries of a changed portion of that design surrounded by a larger unchanged portion.

FIG. 18 presents a generic representation of an electronic design. An "overall design" 840 represents a complete electronic design for a given device or a substantially independent portion of that design. It may or may not subsume an entire target hardware device. Within overall design 840, there is a "changed portion" 842 representing the portion of overall design 840 affected by a user's changes (or independently the design software's changes) after full compilation. While FIG. 18 shows only a single changed region 842, it should be understood that overall design 840 may contain multiple changed portions.

It should also be understood that the changes actually made at the hands of the user may have been limited to a few "new" gates representing a subsection of changed portion 842. However, those changes typically have a wider sphere of influence—directly affecting a more encompassing region delineated by the boundaries of changed portion 842. It is the function of the methods of this invention to identify the boundaries of changed region 842.

FIG. 18 provides a conceptual tool. It may generally describe the state of affairs at various stages in the compilation procedure (e.g., post-synthesis or even post fitting). For purposes of this invention, however, it is most usefully considered to be a pre-synthesis netlist. Regardless of this, changed region 842 should be made as small as possible to reduce the compiler's work on incremental recompile. This allows recompilation to be performed much faster than if the entire design 840 had to be compiled after each design change.

Figure 19B:
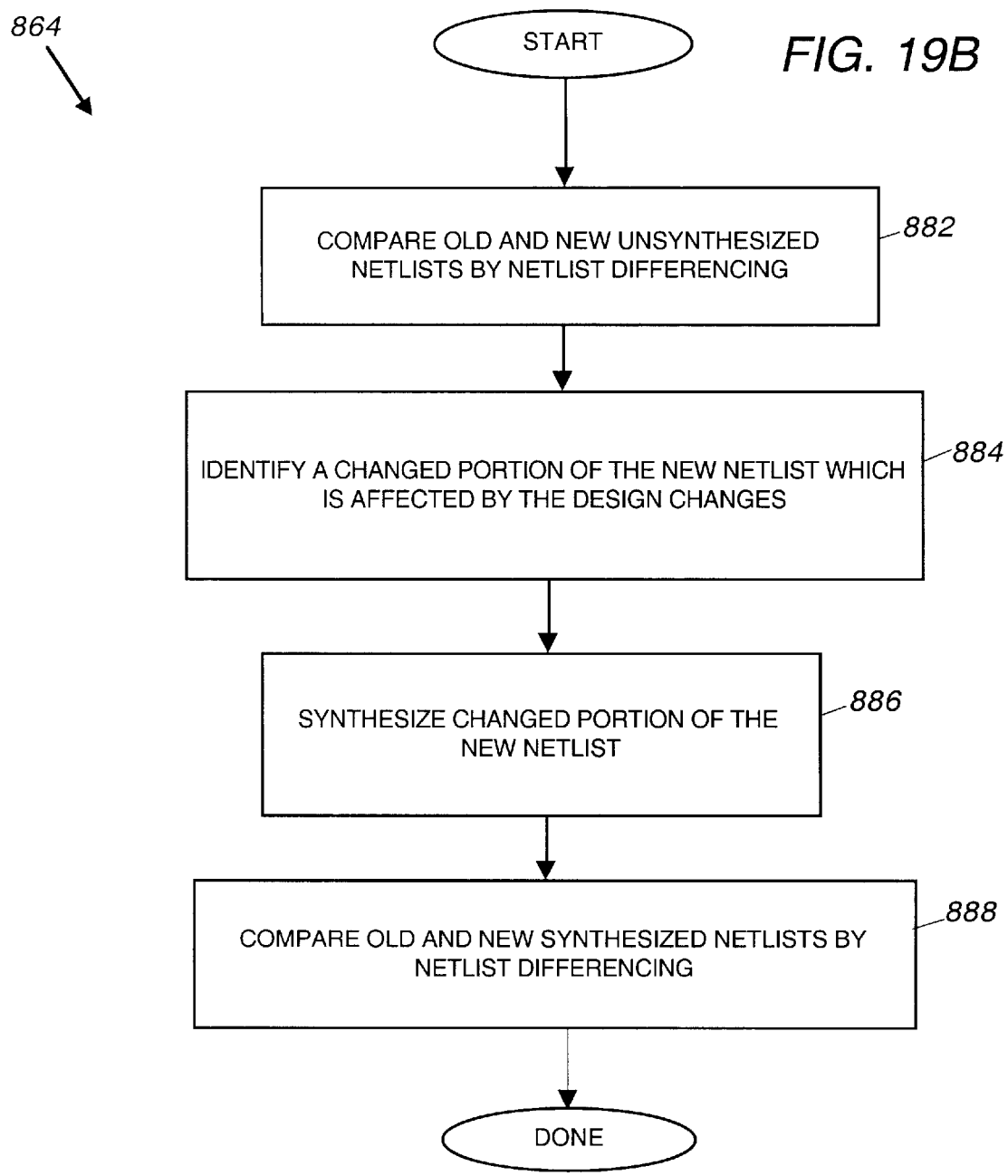

One example of how incremental compilation may be integrated in a larger electronic design automation process is detailed in the process flow diagram depicted in FIGS. 19A and 19B. It should be understood that the described process flow diagram represents but one method for performing incremental recompilation in accordance with the invention. The steps of the process depicted in FIG. 19A can be roughly divided into two stages: (a) an initial compilation stage 876 and (b) an incremental recompilation stage 878.

As shown, a process 850 begins and in step 854 the compiler initiates a full compile of the original unchanged electronic design's netlist. This may simply involve receipt of a user's compilation command. After compilation is initiated, the compiler synthesizes the original design's netlist at a step 856. Then, the gates from the synthesized netlist are mapped, partitioned, and fit into logic cells at a step 858.

During mapping, a technology mapper module of a compiler maps the gates of the synthesized netlist into logic cells. Each logic cell must be able to be put into one logic element which corresponds to a basic physical element of the target hardware device (e.g., a PLD). After technology mapping, the various cells of the electronic design may have to be partitioned between various hardware entities. In some cases, the hardware entities are multiple chips. This is the case when the design is too big to fit on a single chip. Also, the design may be partitioned between entities on a single chip such as rows or quadrants defined according to the architecture of the target hardware device. The purpose of partitioning is to minimize the number signals crossing boundaries between hardware entities.

To complete full compilation, a place and route module of the compiler fits the logic cells. First, the place and route module places the logic cells into the logic elements within the appropriate partition of the programmable logic device. These logic elements have inputs and outputs which are connected together via wires (sometimes referred to as "interconnects") during the routing stage of place and route. Place and route methods are well known to those of skill in the art.

After step 858, the initial compilation is complete and the designer/user may be satisfied with the results. However, this flow is presented to illustrate an incremental recompile so it will be assumed that the user (or the design software) is not completely satisfied with the compiled design and makes a change. Thus, at a step 860, the system accepts a modification of the original design. For example, the user may input his or her modifications at a relatively high level in the design process; by HDL instructions for example. However, the changes are ultimately reflected as direct modifications to one or more of the gates and/or nets of the original unsynthesized netlist. As described below, the direct changes to the new netlist may be identified by comparison with the original netlist. Alternatively, a high level design tool allowing the user to input the changed design may automatically flag new gates and may actually perform step 860.

After the user's changes have been accepted into the design and the new gates have been identified, the second stage (incremental recompile stage 878) of process 850 begins. The compiler now receives an unsynthesized netlist of the changed design at a step 862. It then generates and synthesizes a sub-netlist defining a "changed" portion of the electronic design that has been affected by the user's changes. See step 864. This process step will be detailed below with reference to FIG. 19B. The sub-netlist includes both "new" gates that have been directly modified by the user's changes as well as "affected gates" (indirectly modified gates) that have been influenced by the user's changes. Thereafter, the compiler maps the changed design into logic cells and attempts to partition and fit the changed design into the target hardware device at a step 866. The procedure for attempting the fit will be described in more detail below.

It is possible that the changed design cannot be fit on the target hardware device. Therefore, the compiler must determine at a decision step 868 whether or not the changed design actually fits onto the target hardware device. If the answer is yes, the compiler outputs the compiled design at a step 870 and the process is complete. If, on the other hand, the compiler concludes that the changed design does not fit on the target hardware device, it notifies the user of a failed attempt at a step 872.

One approach to generating and synthesizing a sub-netlist (step 864) is illustrated as a process flow diagram in FIG. 19B. As shown, a generation and synthesis process 864 starts and in step 882 a compiler compares the unsynthesized netlists of the original and changed designs by a process known as "netlist differencing." Netlist differencing identifies all nodes of a netlist that have been directly changed in the original unsynthesized netlist. For example, some gates may be removed, other gates may be added, the function of a gate may be changed, the inputs to a gate of the same function may be changed, etc. As noted above, nodes so identified are referred to as "new" nodes or "directly modified" nodes.

One suitable approach to netlist differencing is described in U.S. patent application Ser. No. 08/619,073, filed on Mar. 20, 1996, naming Lee as inventor and entitled "Methods For Implementing Circuit Designs In Physical Circuits," and is incorporated by reference. This technique involves matching components (e.g., gates) of two netlists having the same user-assigned names. Those components having the same names and features are verified as matching. The unmatched components are further compared by considering the basic features that they have in common and the basic features of their neighboring components. After the component matching procedures have been completed, inter-component connections (nets) are considered. For each matched component, if a matched immediate neighbor of that component is not matched to one of the immediate neighbors of that component's match in the other netlist, then the connection between the component and the matched immediate neighbor is marked changed.

After netlist differencing at step 882, the compiler next identifies a changed portion of the unsynthesized netlist at a step 884. This changed portion is a "sub-netlist" containing the logic nodes that are affected by the design changes identified at step 882 (both directly and indirectly modified nodes).

The compiler may perform step 884 as follows. Initially, the compiler receives a list of one or more new logic nodes in the unsynthesized netlist for the changed electronic design that have been directly changed from the unsynthesized netlist for the original electronic design (determined by netlist differencing). The compiler also identifies "external nodes" which may be registers and/or I/O pins meeting certain criteria. Specifically, external nodes are those registers and I/O pins which are (i) common between the unsynthesized netlist of the changed electronic design and the synthesized netlist of the original electronic design and (ii) output a common signal. With the new nodes and the external nodes in hand, the compiler takes the unsynthesized netlist for the changed electronic design and traces signal propagation paths between the new logic nodes and one or more "external nodes." During the tracing process, the compiler designates all nodes that it encounters on the signal propagation path as affected nodes and groups them in the sub-netlist together with the one or more new logic nodes and external nodes it previously encountered.

After the changed portion of the design has been identified, the compiler synthesizes it at a step 886. To save resources, it typically does not synthesize the unchanged portion of the design. Now, the newly synthesized sub-netlist may replace a corresponding portion of the original synthesized netlist. The original and changed synthesized netlists may optionally be compared against one another by netlist differencing. See step 888. This optional step confirms which nodes of the synthesized netlist have actually changed. Only those gates need be considered in subsequent incremental compilation procedures. The process is now complete and process control is directed to step 866 of process 850 (FIG. 19A). That is, the compiler now maps, partitions, and fits the changed gates of the synthesized netlist into logic cells while preserving as much of the original fitting as possible.

The fitting process (step 866) may be optimized for incremental compilation. First, the compiler receives the compiled version of the original electronic design (this specifies the placement of logic cells from the original electronic design on logic elements (the fundamental hardware units) of the target hardware device (e.g., an unprogrammed PLD)). Next the compiler groups the logic cells of the changed electronic design into (i) a changed portion including logic cells affected by the change to the design, and (ii) an unchanged portion including logic cells not affected by the change. It then fixes logic cells from the unchanged portion of the changed electronic design to an unchanged region of the target hardware device (this is the region of the hardware device where the logic cells from the unchanged portion of the changed electronic were placed in the previously compiled original electronic design). Finally, the compiler attempts to fit logic cells of the changed portion of the electronic design onto logic elements located outside of the unchanged region of the target hardware device while confining logic cells from the unchanged portion of the changed electronic design to their original positions in the unchanged region of the target hardware device (as specified in above).

If the attempt at fitting fails, the compiler allows logic cells from the unchanged portion of the changed electronic design to shift by a limited amount to other logic elements within the target hardware device. At first, this shifting is fairly constrained in order to preserve as much of the original compilation's placement as possible. However, if fitting can not be accomplished under these constraints, gradually the constraints are lifted, until a fit is achieved. In some cases, a fit may not be obtained until all constraints are relaxed—at which point, the compiler has essentially performed a full compile. Nevertheless, in many cases, the fit will be achieved well before a full recompile is required, thereby saving considerable resources during incremental recompile.

In a preferred embodiment, the constraints operate as follows. In a completely constrained system, all cells from the unchanged portion of the design are fixed in exactly the positions (logic elements) to which they were assigned during the full compile of the original design. As noted, this may not allow sufficient flexibility to fit the changed portion of the design. If this is the case, then a first constraint is relaxed and fitting is retried. In one embodiment, this initial relaxation allows logic cells from the unchanged portion of the electronic design to move from their previously assigned logic element to a related logic element. The related logic elements may be a group of proximate logic elements coupled by local interconnects and deemed a "block." Relaxation of this initial constraint allows movement within the block only. Higher level constraints may, if necessary, be subsequently relaxed. This will allow logic cells to shift outside of their initial blocks to logic elements located in other blocks but within some higher level classification of elements (e.g., rows of blocks). Ultimately, if all constraints are relaxed, the logic cells may move to any logic element, regardless of location in the target hardware device.

Computer System Embodiment

Embodiments of the present invention as described above employs various process steps involving data stored in computer systems. These steps are those requiring physical manipulation of physical quantities. Usually, though not necessarily, these quantities take the form of electrical or magnetic signals capable of being stored, transferred, combined, compared, and otherwise manipulated. It is sometimes convenient, principally for reasons of common usage, to refer to these signals as bits, values, elements, variables, characters, data structures, or the like. It should be remembered, however, that all of these and similar terms are to be associated with the appropriate physical quantities and are merely convenient labels applied to these quantities.

Further, the manipulations performed are often referred to in terms such as identifying, running, or comparing. In any of the operations described herein that form part of the present invention these operations are machine operations. Useful machines for performing the operations of embodiments of the present invention include general purpose digital computers or other similar devices. In all cases, there should be borne in mind the distinction between the method of operations in operating a computer and the method of computation itself. Embodiments of the present invention relate to method steps for operating a computer in processing electrical or other physical signals to generate other desired physical signals.

Embodiments of the present invention also relate to an apparatus for performing these operations. This apparatus may be specially constructed for the required purposes, or it may be a general purpose computer selectively activated or reconfigured by a computer program stored in the computer. The processes presented herein are not inherently related to any particular computer or other apparatus. In particular, various general purpose machines may be used with programs written in accordance with the teachings herein, or it may be more convenient to construct a more specialized apparatus to perform the required method steps. The required structure for a variety of these machines will appear from the description given above.

In addition, embodiments of the present invention further relate to computer readable media that include program instructions for performing various computer-implemented operations. The media and program instructions may be those specially designed and constructed for the purposes of the present invention, or they may be of the kind well known and available to those having skill in the computer software arts. Examples of computer-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter.

Figure 20:
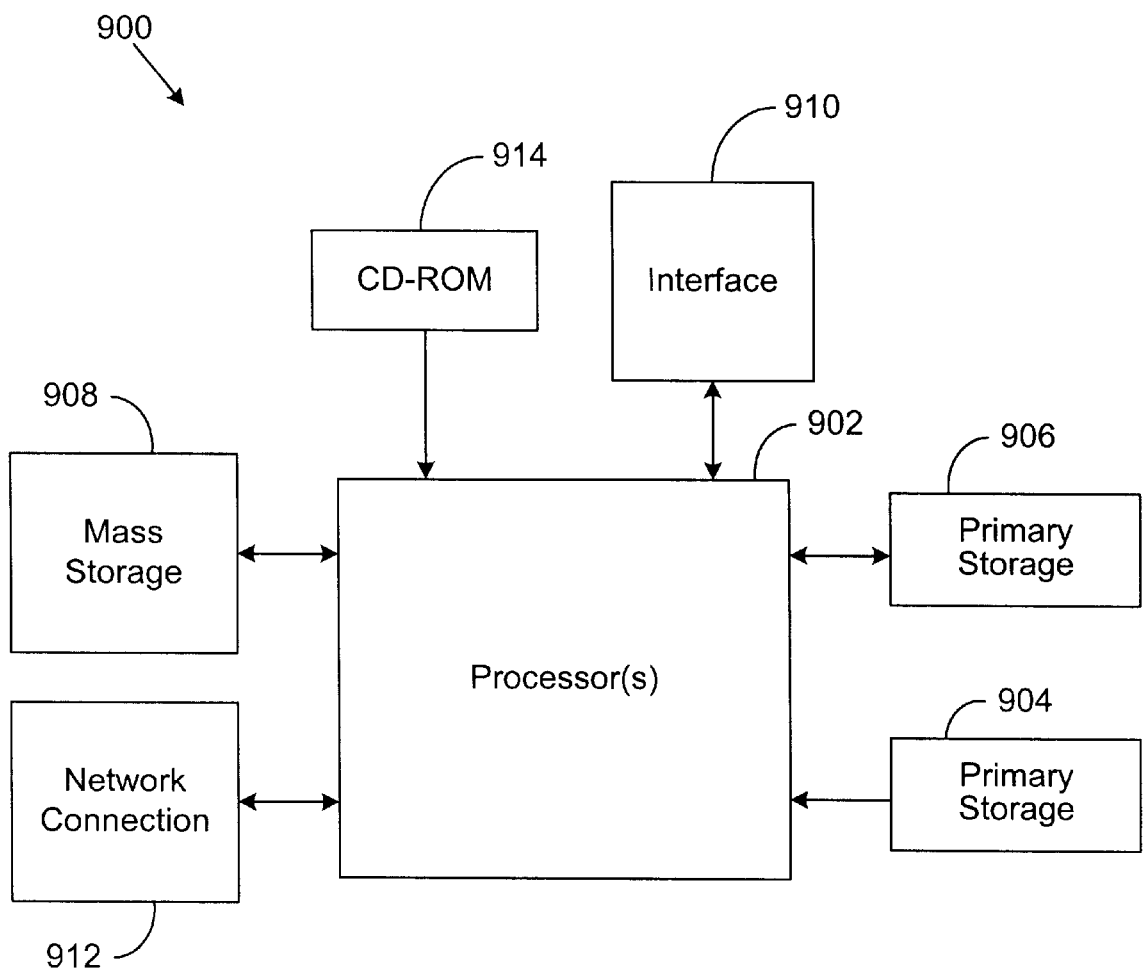
FIG. 20 is a block diagram of a typical computer system suitable for implementing an embodiment of the present invention.

FIG. 20 illustrates a typical computer system in accordance with an embodiment of the present invention. The computer system 900 includes any number of processors 902 (also referred to as central processing units, or CPUs) that are coupled to storage devices including primary storage 906 (typically a random access memory, or RAM), primary storage 904 (typically a read only memory, or ROM). As is well known in the art, primary storage 904 acts to transfer data and instructions uni-directionally to the CPU and primary storage 906 is used typically to transfer data and instructions in a bi-directional manner. Both of these primary storage devices may include any suitable of the computer-readable media described above. A mass storage device 908 is also coupled bi-directionally to CPU 902 and provides additional data storage capacity and may include any of the computer-readable media described above. The mass storage device 908 may be used to store programs, data and the like and is typically a secondary storage medium such as a hard disk that is slower than primary storage. It will be appreciated that the information retained within the mass storage device 908, may, in appropriate cases, be incorporated in standard fashion as part of primary storage 906 as virtual memory. A specific mass storage device such as a CD-ROM 914 may also pass data uni-directionally to the CPU.

CPU 902 is also coupled to an interface 910 that includes one or more input/output devices such as such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 902 optionally may be coupled to a computer or telecommunications network using a network connection as shown generally at 912. With such a network connection, it is contemplated that the CPU might receive information from the network, or might output information to the network in the course of performing the above-described method steps. The above-described devices and materials will be familiar to those of skill in the computer hardware and software arts.

Although the foregoing invention has been described in some detail for purposes of clarity of understanding, it will be apparent that certain changes and modifications may be practiced within the scope of the appended claims. For instance, the present invention is applicable to not only programmable logic and memory devices of a wide variety, but also to any variety of electronic circuit where multiple engineers are working in concert, and to integrated circuits in particular. Also, the work spaces such as the global and local work spaces described herein are not limited to physical locations, but may be implemented as logical work areas that assist in differentiating work files of different users. These work spaces may be implemented on one computer, on different computers, and may communicate with one another via a network connection such as an intranet or internet. In addition, the technique and system of the present invention is suitable for use with a wide variety of EDA tools and methodologies for programming a device. Furthermore, although a variety of file states have been described, many others may be implemented in the context of the present invention. Also, even though one example of incremental compilation has been presented, other suitable techniques may be used. Therefore, the described embodiments should be taken as illustrative and not restrictive, and the invention should not be limited to the details given herein but should be defined by the following claims and their full scope of equivalents.

We claim:

1. A method of incrementally compiling an electronic design within a work group computing system for implementation on a target hardware device, said method comprising:
   compiling a plurality of project source files representing said electronic design to produce a global basis specifying compilation results;
   accepting a modification to said electronic design from a user associated with said work group computing system;
   delineating a sphere of influence of said modification within said electronic design; and
   recompiling that portion of said electronic design within said sphere of influence of said modification to produce a local basis specifying compilation results for said user, whereby said electronic design is recompiled in an efficient manner to incorporate said modification from said user.

2. A method as recited in claim 1 wherein said delineating further includes:
   receiving an unsynthesized netlist for said electronic design, and an unsynthesized netlist representing said electronic design as modified by said user;
   comparing said unsynthesized netlists using netlist differencing to identify a sub-netlist of said electronic design that defines a changed portion of said electronic design; and
   synthesizing said sub-netlist, whereby said synthesized sub-netlist may be recompiled.

3. A method as recited in claim 1 wherein said recompiling further includes:
   synthesizing that portion of said electronic design within said sphere of influence of said modification;
   mapping said portion to said target hardware device; and
   fitting said portion to said target hardware device, whereby said modification of said user in incorporated into said target hardware device.

4. A method as recited in claim 1 further comprising:
   determining whether said portion of said electronic design modified by said user fits within said target hardware device.

5. A method as recited in claim 4 further comprising:
   wherein when it is determined that said portion does not fit, relaxing constraints upon placement of said electronic design within said target hardware device in a predetermined manner until said portion does fit.

6. A method as recited in claim 1 wherein said target hardware device is a programmable logic device (PLD), an application specific integrated circuit (ASIC), a printed circuit board or a multi-chip module.

7. A method of incrementally compiling an electronic design for implementation on a target hardware device, said method comprising:
   receiving a modification to an original electronic design from a user, said modification represented in a changed electronic design;
   receiving an unsynthesized netlist for said original electronic design and an unsynthesized netlist for said changed electronic design;
   performing netlist differencing of said unsynthesized netlists to identify a sub-netlist of said original electronic design that defines a changed portion of said original electronic design;
   synthesizing said sub-netlist; and
   recompiling said synthesized sub-netlist into said target hardware device, whereby said changed electronic design is recompiled in an efficient manner to incorporate said modification from said user.

8. A method as recited in claim 7 wherein said user is part of a workgroup and said method further comprises:
   compiling a plurality of project source files representing said original electronic design, said source files originating from a plurality of users.

9. A method as recited in claim 7 wherein said recompiling further includes:
   mapping said synthesized sub-netlist to said target hardware device; and
   fitting said synthesized sub-netlist to said target hardware device, whereby said modification of said user in incorporated into said target hardware device.

10. A method as recited in claim 7 further comprising:
    determining whether said changed electronic design fits within said target hardware device.

11. A method as recited in claim 10 further comprising:
    wherein when it is determined that said changed electronic design does not fit, relaxing constraints upon placement of said changed electronic design within said target hardware device in a predetermined manner until said changed electronic design does fit.

12. A method as recited in claim 7 wherein said target hardware device is a programmable logic device (PLD), an application specific integrated circuit (ASIC), a printed circuit board or a multi-chip module.

13. A computer-readable medium comprising computer code for incrementally compiling an electronic design within a work group computing system for implementation on a target hardware device, said computer code of said computer-readable medium effecting the following:
    compiling a plurality of project source files representing said electronic design to produce a global basis specifying compilation results;
    accepting a modification to said electronic design from a user associated with said work group computing system;

delineating a sphere of influence of said modification within said electronic design; and recompiling that portion of said electronic design within said sphere of influence of said modification to produce a local basis specifying compilation results for said user, whereby said electronic design is recompiled in an efficient manner to incorporate said modification from said user.

14. A computer-readable medium as recited in claim 13 wherein said delineating further includes computer code for:

receiving an unsynthesized netlist for said electronic design, and an unsynthesized netlist representing said electronic design as modified by said user; comparing said unsynthesized netlists using netlist differencing to identify a sub-netlist of said electronic design that defines a changed portion of said electronic design; and synthesizing said sub-netlist, whereby said synthesized sub-netlist may be recompiled.

15. A computer-readable medium as recited in claim 13 wherein said recompiling further includes computer code for:

synthesizing that portion of said electronic design within said sphere of influence of said modification;

mapping said portion to said target hardware device; and fitting said portion to said target hardware device, whereby said modification of said user in incorporated into said target hardware device.

16. A computer-readable medium as recited in claim 13 further comprising computer code for:

determining whether said portion of said electronic design modified by said user fits within said target hardware device.

17. A computer-readable medium as recited in claim 16, where in when it is determined that said portion does not fit, further comprises computer code for:

relaxing constraints upon placement of said electronic design within said target hardware device in a predetermined manner until said portion does fit.

18. A computer-readable medium as recited in claim 13 wherein said target hardware device is a programmable logic device (PLD), an application specific integrated circuit (ASIC), a printed circuit board or a multi-chip module.

19. A computer-readable medium comprising computer code for incrementally compiling an electronic design for implementation on a target hardware device, said computer code of said computer-readable medium effecting the following:

receiving a modification to an original electronic design from a user, said modification represented in a changed electronic design;

receiving an unsynthesized netlist for said original electronic design and an unsynthesized netlist for said changed electronic design;

performing netlist differencing of said unsynthesized netlists to identify a sub-netlist of said original electronic design that defines a changed portion of said original electronic design;

synthesizing said sub-netlist; and recompiling said synthesized sub-netlist into said target hardware device, whereby said changed electronic design is recompiled in an efficient manner to incorporate said modification from said user.

20. A computer-readable medium as recited in claim 19 wherein said user is part of a workgroup and said method further comprises computer code for:

compiling a plurality of project source files representing said original electronic design, said source files originating from a plurality of users.

21. A computer-readable medium as recited in claim 19 wherein said recompiling further includes computer code for:

mapping said synthesized sub-netlist to said target hardware device; and fitting said synthesized sub-netlist to said target hardware device, whereby said modification of said user in incorporated into said target hardware device.

22. A computer-readable medium as recited in claim 19 further comprising computer code for:

determining whether said changed electronic design fits within said target hardware device.

23. A computer-readable medium as recited in claim 22 wherein when it is determined that said changed electronic design does not fit, further comprises computer code for:

relaxing constraints upon placement of said changed electronic design within said target hardware device in a predetermined manner until said changed electronic design does fit.

24. A computer-readable medium as recited in claim 19 wherein said target hardware device is a programmable logic device (PLD), an application specific integrated circuit (ASIC), a printed circuit board or a multi-chip module.

* * * * *